(12) United States Patent
Wells et al.

(10) Patent No.: US 11,506,319 B2
(45) Date of Patent: Nov. 22, 2022

(54) HOT TAP ASSEMBLY AND METHOD

(71) Applicant: BP Corporation North America Inc., Houston, TX (US)

(72) Inventors: Shane Wells, Brookshire, TX (US); Ronald K. Berger, Houston, TX (US); James Longville, Westminster, CO (US)

(73) Assignee: BP Corporation North America Inc., Houston, TX (US)

( * ) Notice: Subject to any disclaimer, the term of this patent is extended or adjusted under 35 U.S.C. 154(b) by 264 days.

(21) Appl. No.: 16/935,573

(22) Filed: Jul. 22, 2020

(65) Prior Publication Data

US 2021/0025529 A1 Jan. 28, 2021

Related U.S. Application Data

(60) Provisional application No. 62/877,632, filed on Jul. 23, 2019.

(51) Int. Cl.
| | |
|---|---|
| *F16L 41/06* | (2006.01) |
| *F16L 1/26* | (2006.01) |
| *E21B 37/00* | (2006.01) |

(52) U.S. Cl.
CPC ............. *F16L 41/06* (2013.01); *F16L 1/26* (2013.01); *E21B 37/00* (2013.01)

(58) Field of Classification Search
CPC ........ F16L 41/06; F16L 1/26; Y10T 137/6123
See application file for complete search history.

(56) References Cited

U.S. PATENT DOCUMENTS

| | | | | |
|---|---|---|---|---|
| 3,364,939 A | * | 1/1968 | Valenziano | F16L 41/06 408/1 R |
| 4,050,720 A | * | 9/1977 | Reneau | F16L 41/06 285/133.11 |

(Continued)

FOREIGN PATENT DOCUMENTS

| | | |
|---|---|---|
| EP | 2372206 A1 | 10/2011 |
| EP | 3411557 A1 | 12/2018 |

(Continued)

OTHER PUBLICATIONS

International Search Report and Written Opinion dated Mar. 6, 2020, for PCT/US2019/064222, filed on Dec. 3, 2019.

(Continued)

*Primary Examiner* — Reinaldo Sanchez-Medina
(74) *Attorney, Agent, or Firm* — Conley Rose, P.C.

(57) ABSTRACT

A hot tap assembly for accessing a subsea fluid system includes a landing structure configured to releasably attach to a subsea fluid conduit of the subsea fluid system, a clamp assembly positionable on the landing structure, where in the clamp assembly includes a hot tap clamp including a first jaw and a second jaw, wherein a first annular seal assembly and a second annular seal assembly are disposed on an engagement surface of the second jaw, and a drill assembly positionable on the landing structure, wherein the drill assembly includes a drill disposed in a central conduit that is insertable through a central passage formed in the second jaw of the clamp assembly, wherein the hot tap clamp is configured to actuate between an open position configured to receive the subsea fluid conduit and a closed position configured to sealingly engage the subsea fluid conduit with the first seal assembly and the second seal assembly of the clamp assembly.

19 Claims, 14 Drawing Sheets

(56) References Cited

U.S. PATENT DOCUMENTS

| | | | |
|---|---|---|---|
| 4,223,925 A * | 9/1980 | Reneau | F16L 41/06 285/348 |
| 5,778,981 A | 7/1998 | Head | |
| 6,200,068 B1 | 3/2001 | Bath et al. | |
| 6,290,432 B1 * | 9/2001 | Exley | F16L 1/26 15/104.062 |
| 7,793,723 B2 | 9/2010 | Vedeld et al. | |
| 7,798,232 B2 | 9/2010 | Headworth | |
| 8,534,306 B2 * | 9/2013 | Ayers | F16L 41/06 137/15.14 |
| 8,657,531 B2 | 2/2014 | Rios | |
| 9,004,813 B2 * | 4/2015 | Al-Buraik | E02B 15/04 405/60 |
| 9,714,727 B2 | 7/2017 | Tan et al. | |
| 9,797,223 B1 | 10/2017 | Gordon | |
| 10,273,785 B2 | 4/2019 | Older et al. | |
| 10,989,348 B2 * | 4/2021 | Restivo | F16L 55/18 |
| 2003/0056954 A1 | 3/2003 | Headworth | |
| 2010/0018693 A1 | 1/2010 | Duncan et al. | |
| 2010/0212754 A1 | 8/2010 | Ayers et al. | |
| 2015/0060079 A1 | 3/2015 | Clements et al. | |
| 2015/0136409 A1 | 5/2015 | Hall et al. | |
| 2019/0345780 A1 | 11/2019 | Almerico | |

FOREIGN PATENT DOCUMENTS

| | | |
|---|---|---|
| GB | 2457081 A | 8/2009 |
| WO | 200060262 A1 | 10/2000 |
| WO | 20160120624 A3 | 8/2016 |

OTHER PUBLICATIONS

International Search Report and Written Opinion dated Oct. 12, 2020 for PCT/US2020/043100 filed on Jul. 22, 2020.

International Search Report and Written Opinion dated Oct. 12, 2020 for PCT/US2020/043094 filed on Jul. 22, 2020.

* cited by examiner

HOT TAP ASSEMBLY AND METHOD

CROSS-REFERENCE TO RELATED APPLICATIONS

This application claims benefit of U.S. provisional patent application Ser. No. 62/877,632 filed Jul. 23, 2019, and entitled "Hot Tap Assembly and Method," which is hereby incorporated herein by reference in its entirety.

STATEMENT REGARDING FEDERALLY SPONSORED RESEARCH OR DEVELOPMENT

Not applicable.

BACKGROUND

Systems for producing hydrocarbons in offshore environments typically include a structure disposed at the waterline (e.g., a production platform), one or more subsea wells extending from the seabed into an earthen formation, components disposed at the seabed and coupled to the wells (e.g., a subsea tree, template, manifold, pipeline, and pipeline end termination (PLET), etc.), and flowlines extending between the surface and the seabed components (e.g., a riser system, umbilical, etc.). Blockages may arise in the components disposed at the seabed and/or in fluid conduits coupled thereto. Such blockages may result from asphaltene, natural gas hydrates, or sand or scale.

SUMMARY

An embodiment of a hot tap assembly for accessing a subsea fluid system comprises a landing structure configured to releasably attach to a subsea fluid conduit of the subsea fluid system, a clamp assembly positionable on the landing structure, where in the clamp assembly comprises a hot tap clamp including a first jaw and a second jaw, wherein a first annular seal assembly and a second annular seal assembly are disposed on an engagement surface of the second jaw, and a drill assembly positionable on the landing structure, wherein the drill assembly comprises a drill disposed in a central conduit that is insertable through a central passage formed in the second jaw of the clamp assembly, wherein the hot tap clamp is configured to actuate between an open position configured to receive the subsea fluid conduit and a closed position configured to sealingly engage the subsea fluid conduit with the first seal assembly and the second seal assembly of the clamp assembly. In some embodiments, both the first seal assembly and the second seal assembly extend concentrically entirely around the central passage of the second jaw of the clamp assembly, and wherein the second seal assembly extends concentrically entirely around the first seal assembly. In some embodiments, an annular surface is formed on the second jaw between the first seal assembly and the second seal assembly, and wherein the annular surface extends entirely around the central passage of the second jaw of the clamp assembly. In certain embodiments, a first port extends through the annular surface formed on the second jaw of the clamp assembly. In certain embodiments, the clamp assembly comprises a hot stab assembly configured to circulate a fluid through the first port, the annular surface, and a second port extending through the annular surface. In some embodiments, both the first seal assembly and the second seal assembly are positioned on a semi-circular engagement surface of the second jaw. In some embodiments, the clamp assembly comprises a manifold comprising a hot stab connector for coupling with the coil tubing and a first isolation valve configured to fluidically isolate the hot stab connector from the central passage of the second jaw. In some embodiments, the manifold comprises a second isolation valve configured to fluidically isolate the central conduit of the drill assembly from the central passage of the second jaw of the clamp assembly. In certain embodiments, the drill assembly comprises a drill motor configured to rotate the drill and a feed motor configured to feed the drill through the central passage of the second jaw of the clamp assembly. In certain embodiments, the landing structure comprises a support clamp that is actuatable between an open position configured to receive the subsea fluid conduit and a closed position configured to lock the landing structure to the subsea fluid conduit.

An embodiment of a system for intervening in a subsea fluid system comprises a surface system disposed on a surface vessel, a hot tap assembly deployable from the surface vessel and configured to connect a subsea fluid conduit of the subsea fluid system, wherein the hot tap assembly has an open position configured to receive the subsea fluid conduit and a closed position configured to sealingly engage the subsea fluid conduit with a first seal assembly and a second seal assembly of a clamp assembly of the hot tap assembly, and a remotely operated underwater vehicle (ROV) deployable from the surface system and configured to connect the hot tap assembly to the subsea fluid conduit whereby fluid communication is established between the subsea fluid conduit and the hot tap assembly. In some embodiments, the system further comprises an injection pump fluidically connected to the hot tap assembly and configured to pump a fluid through the hot tap assembly and between the surface system and the subsea fluid conduit. In some embodiments, the clamp assembly comprises a hot tap clamp including a first jaw and a second jaw, wherein the first annular seal assembly and the second annular seal assembly are positioned on an engagement surface of the second jaw. In certain embodiments, both the first seal assembly and the second seal assembly extend concentrically entirely around a central passage of the second jaw of the clamp assembly, and an annular surface is formed on the second jaw between the first seal assembly and the second seal assembly, and wherein the annular surface extends entirely around the central passage of the second jaw of the clamp assembly. In certain embodiments, the clamp assembly comprises a hot stab assembly configured to circulate a fluid through a first port extending through the annular surface, the annular surface, and a second port extending through the annular surface. In some embodiments, the hot tap assembly comprises a landing structure configured to releasably couple with a subsea fluid conduit of the subsea fluid system, and a drill assembly positionable on the landing structure and comprising a drill positioned in a central conduit that is insertable through a central passage formed in the second jaw of the clamp assembly, wherein the clamp assembly is positionable on the landing structure. In some embodiments, the clamp assembly comprises a manifold comprising a hot stab connector for coupling with a coil tubing extendable from the surface system and a first isolation valve configured to fluidically isolate the hot stab connector from a central passage of the second jaw.

An embodiment of a method for intervening in a subsea fluid system comprises (a) transporting a clamp assembly of a hot tap assembly to a subsea fluid conduit of the subsea fluid system, (b) inserting the subsea fluid conduit into a hot tap clamp of the clamp assembly, (c) actuating the hot tap clamp from an open position to a closed position using a remotely operated underwater vehicle (ROV), and (d) sealingly engaging the subsea fluid conduit with a first seal assembly and a second seal assembly of the clamp assembly. In some embodiments, the method further comprises (e) operating a hot stab assembly of the clamp assembly to pressurize an annulus positioned radially between the first seal assembly and the second seal assembly. In some embodiments, the method further comprises (e) forming a perforation in the subsea fluid conduit with a drill of the hot tap assembly, wherein the first seal assembly and the second seal assembly each entirely encircle the perforation.

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of various exemplary embodiments, reference will now be made to the accompanying drawings in which.

DETAILED DESCRIPTION

Figure 1:
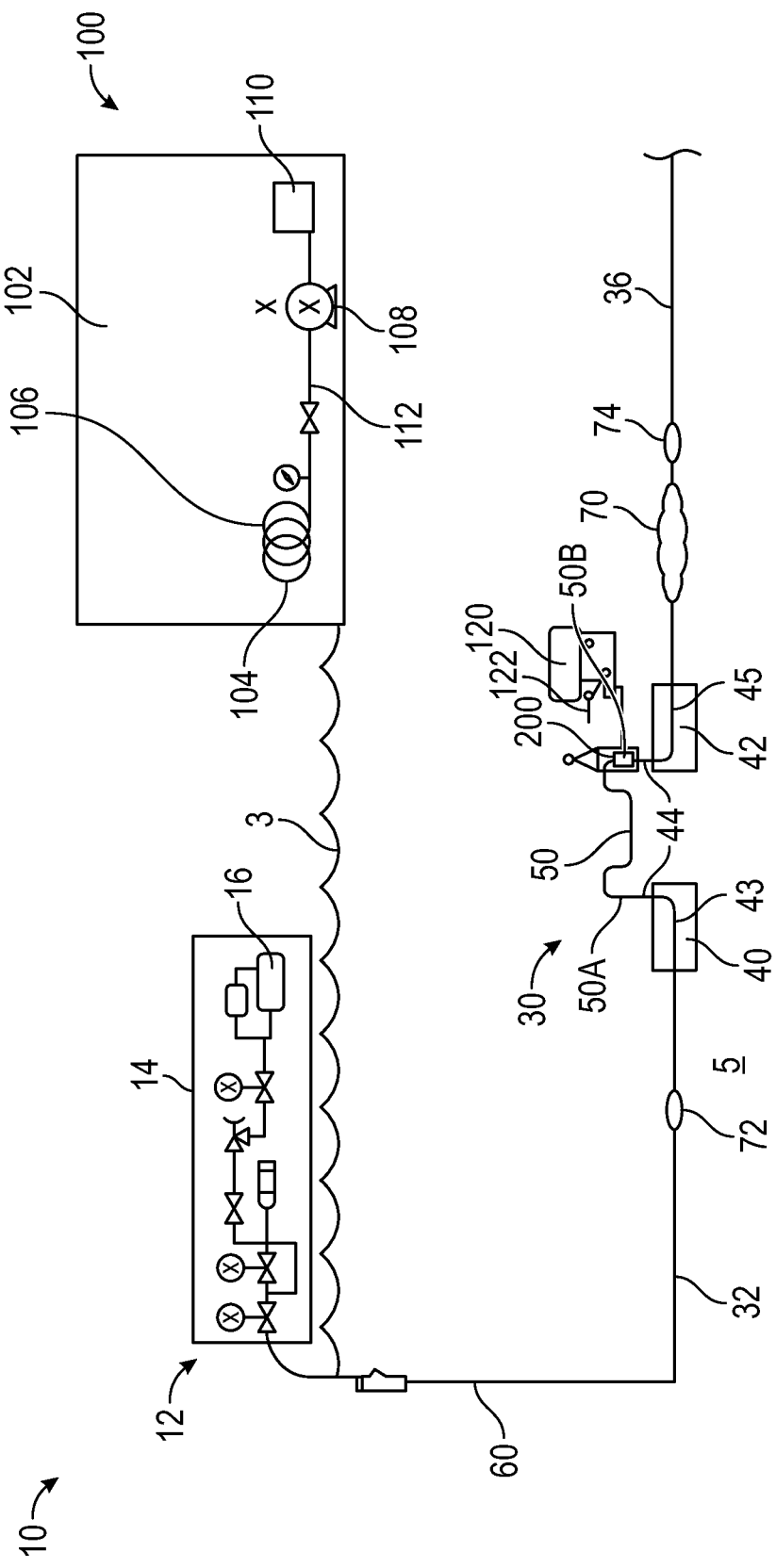
FIG. 1 is a schematic view of an embodiment of a subsea intervention system in accordance with principles disclosed herein for remediating a blockage formed in an offshore well system.

The following discussion is directed to various exemplary embodiments. However, one skilled in the art will understand that the examples disclosed herein have broad application, and that the discussion of any embodiment is meant only to be exemplary of that embodiment, and not intended to suggest that the scope of the disclosure, including the claims, is limited to that embodiment. Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection of the two devices, or through an indirect connection that is established via other devices, components, nodes, and connections. In addition, as used herein, the terms "axial" and "axially" generally mean along or parallel to a particular axis (e.g., central axis of a body or a port), while the terms "radial" and "radially" generally mean perpendicular to a particular axis. For instance, an axial distance refers to a distance measured along or parallel to the axis, and a radial distance means a distance measured perpendicular to the axis. Any reference to up or down in the description and the claims is made for purposes of clarity, with "up", "upper", "upwardly", "uphole", or "upstream" meaning toward the surface of the borehole and with "down", "lower", "downwardly", "downhole", or "downstream" meaning toward the terminal end of the borehole, regardless of the borehole orientation. As used herein, the terms "approximately," "about," "substantially," and the like mean within 10% (i.e., plus or minus 10%) of the recited value. Thus, for example, a recited angle of "about 80 degrees" refers to an angle ranging from 72 degrees to 88 degrees.

As described above, offshore systems may include one or more subsea fluid conduits transporting fluids between components positioned on the seabed (e.g., subsea trees, manifolds, PLETs, etc.) as well as components positioned at the surface, and blockages may occur within one or more subsea fluid conduits of the offshore system during the operation thereof. In some applications a "hot tap" assembly or device may be employed to establish fluid communication with a subsea fluid conduit having a blockage formed therein. As used herein, the term "hot tap assembly" refers to a device configured to penetrate or drill into an outer cylindrical surface of a live subsea fluid conduit having fluid disposed therein to thereby establish fluid communication between the subsea fluid conduit and the hot tap assembly in a manner in which the fluid disposed in the subsea fluid conduit is not exposed to the environment surrounding the subsea fluid conduit. Thus, a hot tap assembly may be used to tap into a live subsea fluid conduit and transport fluids into or out of the subsea fluid conduit without exposing the transported fluids to the subsea environment.

Conventional hot tap assemblies used to tap into live subsea fluid conduits are typically large and bulky and thus must be lowered down onto subsea fluid pipeline via a cable suspended from a lifting crane of a surface vessel or platform. One lowered onto the subsea fluid conduit, the conventional hot tap assembly may be clamped around the exterior of the fluid conduit whereby a plurality of annular seals extending about the circumference of the subsea fluid conduit seal an annulus formed between the hot tap and the fluid conduit where the annulus extends entirely about the fluid conduit. In some applications, divers may be used to assist with the operations of coupling the conventional hot tap assembly with the subsea fluid conduit. Once clamped around the subsea fluid conduit, a separate drilling assembly will be lowered down on a cable suspended from the surface vessel and landed on the conventional hot tap assembly for drilling into the exterior of the subsea fluid conduit to establish fluid communication therewith. Thus, conventional hot tap assemblies may be cumbersome and expensive to install due to their size and bulkiness. Additionally, by sealing about the entire circumference of the subsea fluid conduit the amount of fluid pressure contained within the fluid pipeline the conventional hot tap assembly may be capable of sealing may be limited due to relatively large hoop stresses imparted to the conventional hot tap assembly by the pressurized fluid positioned in the annulus between the subsea fluid conduit and the conventional hot tap assembly.

Accordingly, embodiments described herein pertain to hot tap assemblies that are small and light enough to be installed using a remotely operated underwater vehicle (ROV) at a location vertically spaced from the seabed. Additionally, embodiments of hot tap assemblies described herein do not seal about the entire circumference of the subsea fluid conduit to which they penetrate and couple, and thus may successfully seal substantially higher fluid pressures than conventional subsea hot tap assemblies, including pressures of approximately between 4,000 pounds per square inch (PSI) and 8,000 PSI; however, in other embodiments, hot tap assemblies disclosed herein may seal pressures exceeding 10,000 PSI.

Referring now to FIG. 1, an embodiment of an offshore well system 10 is shown. In the embodiment of FIG. 1, offshore well system 10 is an offshore production system for producing and transporting hydrocarbons from one or more subsea wells, and thus may be referred to herein as an offshore production system 10. In this embodiment, offshore production system 10 generally includes a surface system 12 positioned at a surface or waterline 3, a subsea fluid system 30 positioned at or near a seabed 5, and a fluid conduit 60 extending vertically between surface system 12 and subsea fluid system 30. The surface system 12 includes a surface vessel 14 having process fluid system 16 positioned thereon. Surface vessel 14 may be an offshore platform or ship. Process fluid system 16 includes equipment for processing, transporting, and storing fluids of offshore production system 10.

Subsea fluid system 30 includes a plurality of subsea components positioned at or near the seabed 5. More specifically, in this embodiment, subsea fluid system 30 includes a pair of subsea fluid conduits or flowlines 32, 36, a pair of subsea terminals 40, 42, and a subsea fluid conduit or rigid jumper 50 extending between terminals 40, 42. A first flowline 32 of the pair of flowlines 32, 36 is coupled between vertical fluid conduit 60 and a first terminal 40. A second flowline 36 of the pair of flowlines 32, 36 is coupled to a second terminal 42 of the pair of terminals 40, 42. In this embodiment, each terminal 40, 42 includes an internal fluid passage 43, 45, respectively, and a vertically oriented connector hub 44. Jumper 50 has a first end 50A connected to the connector hub 44 of first terminal 40 and a second end 50B connected to the connector hub 44 of second terminal 42. In this embodiment, jumper 50 is a rigid steel jumper; however, in general, jumper 50 may be any type of subsea jumper suitable for use in an offshore environment.

In FIG. 1, each subsea terminal 40, 42 is shown as a pipeline end termination (PLET), however, in other embodiments, each terminal 40, 42 may be any type of subsea equipment including a subsea pipeline end manifold (PLEM), a subsea manifold, or any other subsea structure coupled to a subsea fluid conduit. Additionally, although in FIG. 1 only subsea components 32, 36, 40, 42, 50 of subsea fluid system 30 are shown, subsea fluid system 30 can include one or more additional subsea components in fluid communication with subsea components 32, 36, 40, 42, 50. For instance, the second flowline 36 of subsea fluid system 30 may be connected with one or more PLEMs, manifolds, etc. The vertical fluid conduit 60 of offshore production system 10 is coupled between the first flowline 32 of subsea fluid system 30 and the process fluid system 16 of surface system 10. In this embodiment, vertical fluid conduit 60 is a production riser; however, in other embodiments, vertical fluid conduit 60 may be another type of fluid conveying conduit or member, such as a jumper. Subsea fluid conduits 32, 36, and 50 of subsea fluid system 30 may comprise "infield" subsea fluid conduits containing live production fluids and positioned between offshore production platform and a subsea well (not shown in FIG. 1) located upstream from conduits 32, 36, and 50. Thus, subsea fluid conduits 32, 36, and 50 may be pressure rated at the shut-in pressure for the subsea well which may be between approximately 5,000 PSI and 10,000 PSI.

In some applications, it may be desired to establish direct access or fluid communication with one or more subsea components of subsea fluid system 30. For example, blockages may arise in one or more flow passages and/or fluid conduits of offshore production system 10, including within one or more of the subsea components 32, 36, 40, 42, 50 of subsea fluid system 30. Such blockages may undesirably restrict the flow of fluids through the flow passages, and in some extreme cases, completely block the flow of fluids through the flow passages. An embodiment of an offshore intervention or remediation system 100 is shown in FIG. 1 for providing access to one or more of the subsea components of subsea fluid system 30. In this embodiment, intervention system 100 is employed to identify, and remediate (e.g., at least partially remove) blockages formed in the one or more subsea components 32, 36, 40, 42, 50 of the subsea fluid system 30; however, in other embodiments, intervention system 100 may be employed to provide direct access to one or more subsea components of subsea fluid system 30 for other reasons. For example, intervention system 100 may be employed to allow for the injection of chemicals into subsea fluid system 30 to assist with the production of hydrocarbons from offshore production system 10 and in response to flow assurance, equipment hardware issues, or other reasons.

In this embodiment, intervention system 100 generally includes a surface vessel 102 with process fluid equipment and a hot tap assembly 200 for accessing one or more subsea components of subsea fluid system 30. In this embodiment, the surface vessel 102 is a ship (e.g., a multi-service vessel or work-over ship), however, in other embodiments, surface vessel 102 may be an offshore platform (e.g., floating platform, bottom founded platform, etc.). The process fluid equipment on surface vessel 102 includes a throughbore tooling or coil tubing 104, a tubing guide or injection assembly 106, a fluid injection pump 108, an injection fluid tank 110, and an injection fluid conduit 112. Injection fluid conduit 112 extends between injection pump 108 and injection fluid tank 110. Coil tubing 104 comprises flexible or coiled tubing that is extendable and retractable from surface vessel 102 via the actuation of guide assembly 106. Additionally, intervention system 100 may include a ROV 120 deployable from surface vessel 102 and which may be configured to guide components of hot tap assembly 200 to one of the subsea fluid conduits 32, 36, and 50 of subsea fluid system 30. ROV 120 may also be configured to install or couple the components of hot tap assembly 200 to one of the subsea fluid conduits 32, 36, and 50 of subsea fluid system 30 whereby fluid communication is established therebetween, rendering unnecessary the use of divers or equipment other than ROV 120 for installing at least some of the components of hot tap assembly 200. ROV 200 may also fluidically connect hot tap assembly 200 to a fluid source (e.g., a fluid source of surface system 100) to allow for the injection of fluids or chemicals into one or more of conduits 32, 36, and 50 of subsea fluid system 30.

In this embodiment, flowlines 32, 36 are production pipelines that transport production fluids (e.g., hydrocarbons) from one or more subsea wells to subsea terminals 40, 42, respectively. As described above, blockages may form in various subsea conduits and flow lines. In this example, a first or primary blockage 70 resides in second flowline 36 and a pair of second or secondary blockages 72, 74 reside in flowlines 32, 36, respectively. In this embodiment, blockage 70 is positioned between second subsea terminal 42 and the second hydrate blockage 74. In general, the blockages 70, 72, 74 may be formed by any material(s), however, in this embodiment, blockage 70 is an organic blockage formed by an accumulation of organic material such as asphaltenes and each blockage 72, 74 is formed by hydrates. Hot tap assembly 200 is designed to remediate blockages 70, 72, 74. In particular, hot tap assembly 200 is configured to penetrate or drill into an external surface of one of the subsea fluid conduits 32, 36, and 50 of subsea fluid system 30 to establish fluid communication between the penetrated fluid conduit 32, 36, and 50 and the hot tap assembly 200 in a manner where the penetrated subsea fluid conduit 32, 36, and 50 is not exposed to the external subsea environment. In this manner, hot tap assembly may provide direct access and fluid communication to one or more subsea components of subsea fluid system 30 while preventing fluids within subsea fluid system 30 from escaping into the surrounding subsea environment. Thus, hot top assembly 200 of intervention system 100 facilitates the selective injection of fluids into jumper 50 (as well as other components of subsea fluid system 30) and the selective withdrawal of fluids from jumper 50. Additionally, hot tap assembly 200 provides for the selective manipulation of fluid pressure within components of subsea fluid system 30, including jumper 50.

Figure 2:
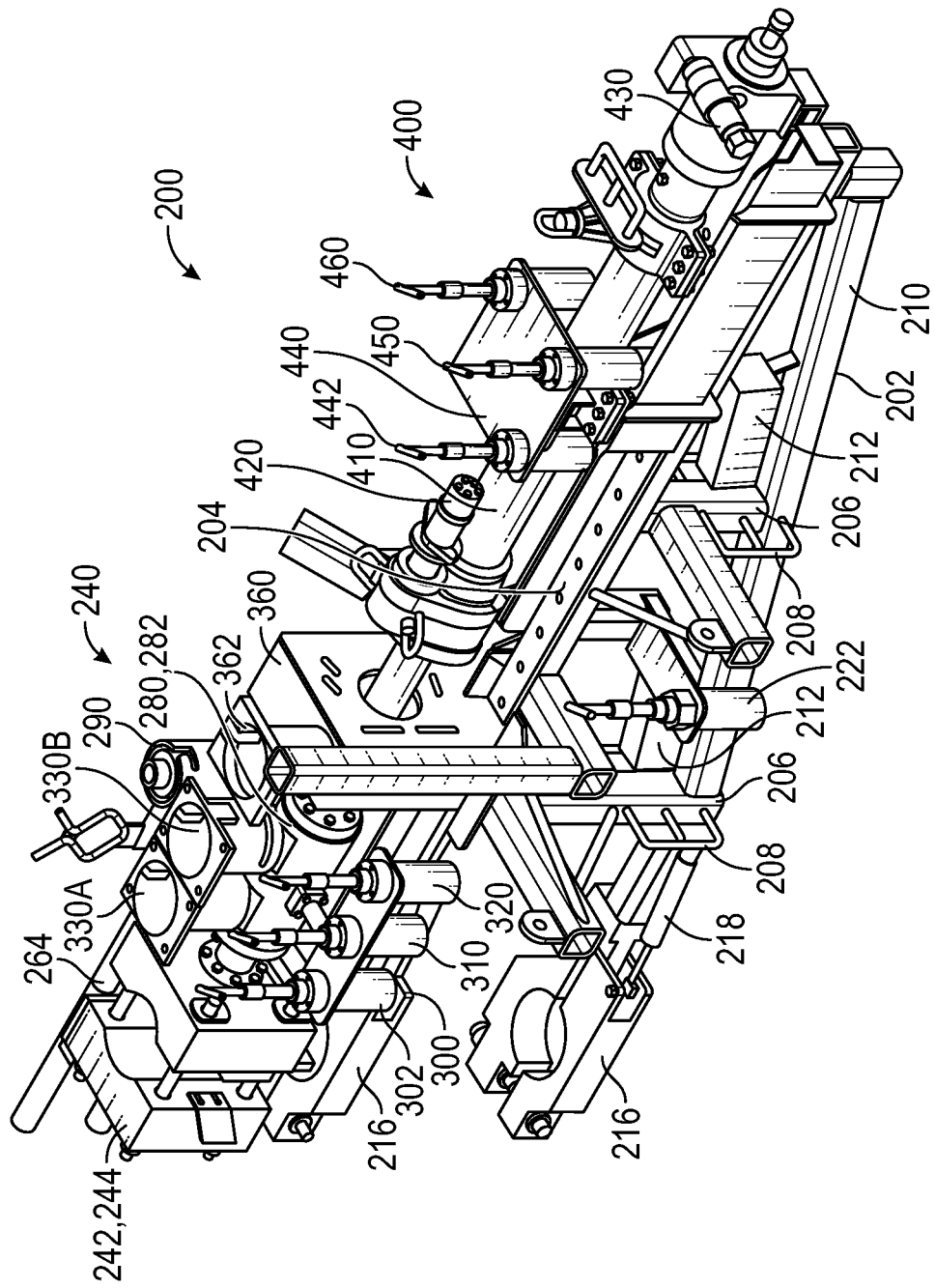
FIG. 2 is a perspective view of the hot tap assembly of the intervention system of FIG. 1.
Figure 3:
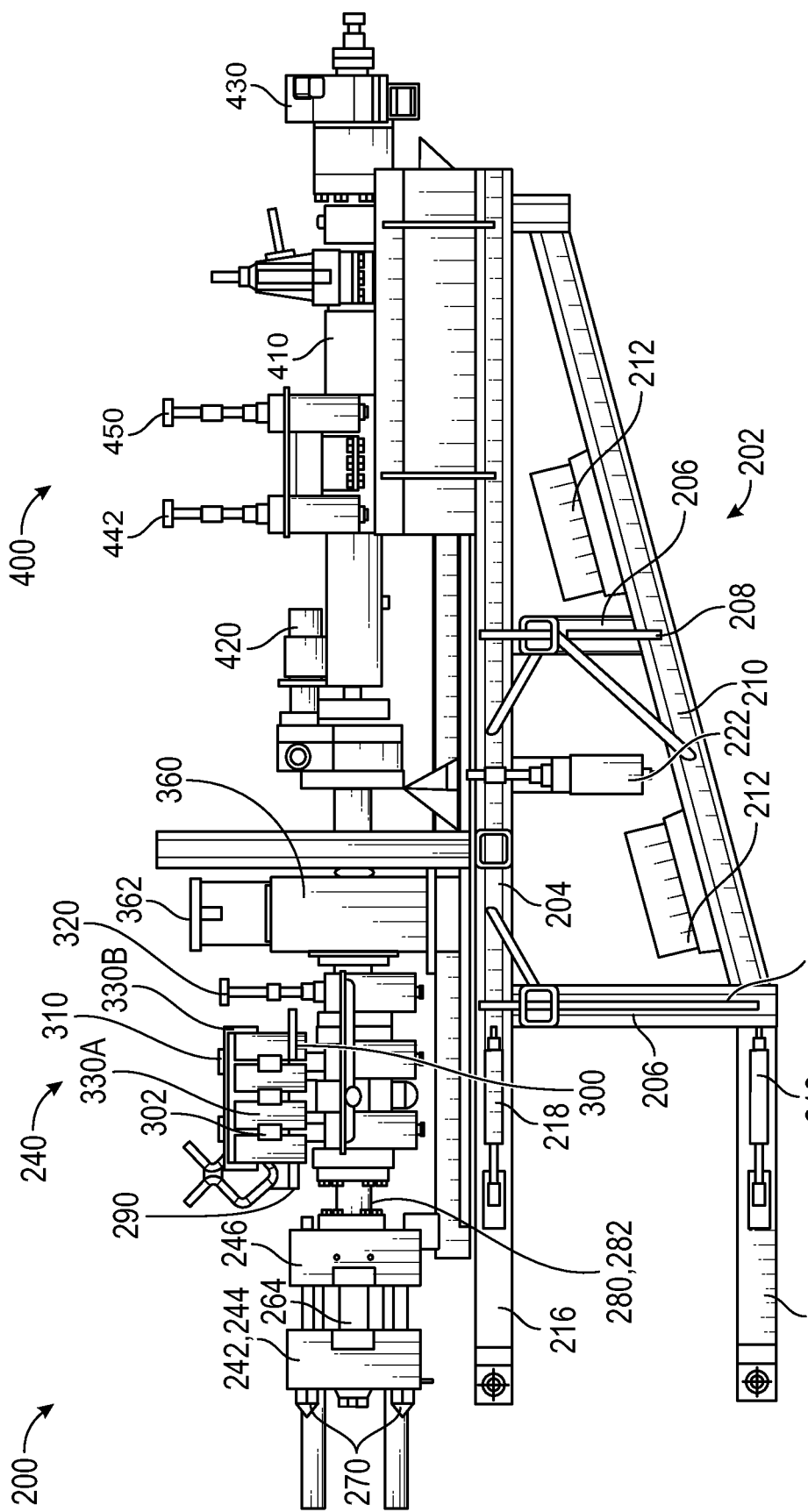
FIG. 3 is a side view of the hot tap assembly of FIG. 2.
Figure 4:
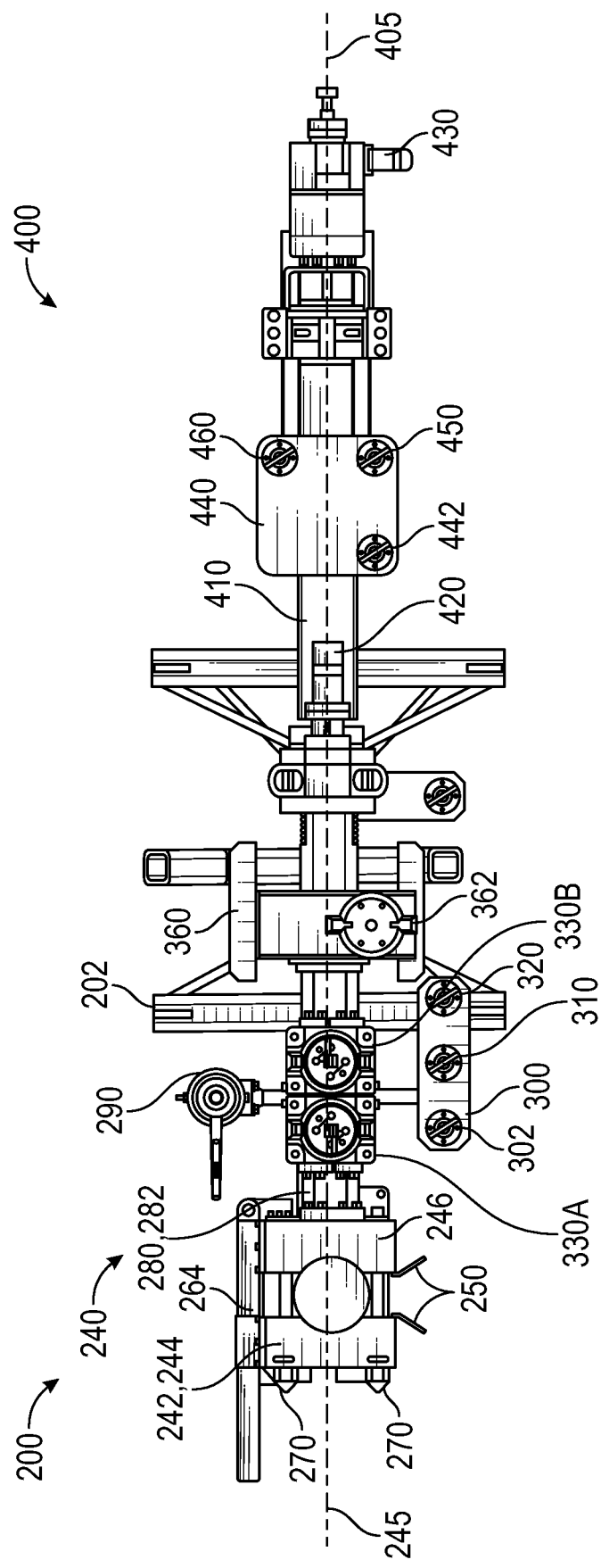
FIG. 4 is a top view of the hot tap assembly of FIG. 2.

Referring to FIGS. 2-4, hot tap assembly 200 of the intervention system 100 of FIG. 1 is shown. In this embodiment, hot tap assembly 200 generally includes a support frame or dynamic landing structure 202, a clamp assembly 240, and a drill assembly 400. In some embodiments, hot tap assembly 200 may have a maximum weight (in air) of approximately between 4,000 pounds (lbs) and 4,500 lbs, sufficiently low to allow the entire weight of hot tap assembly 200 to be supported by subsea fluid system 30; however, in other embodiments, the maximum weight of hot tap assembly 200 may vary. Landing structure 202 of hot tap assembly 200 releasably couples to subsea components of subsea fluid system 30, including jumper 50. Particularly, landing structure 202 transfers structural loads from clamp assembly 240 and drill assembly 400 to the subsea component to which landing structure 202 is attached.

Figure 5:
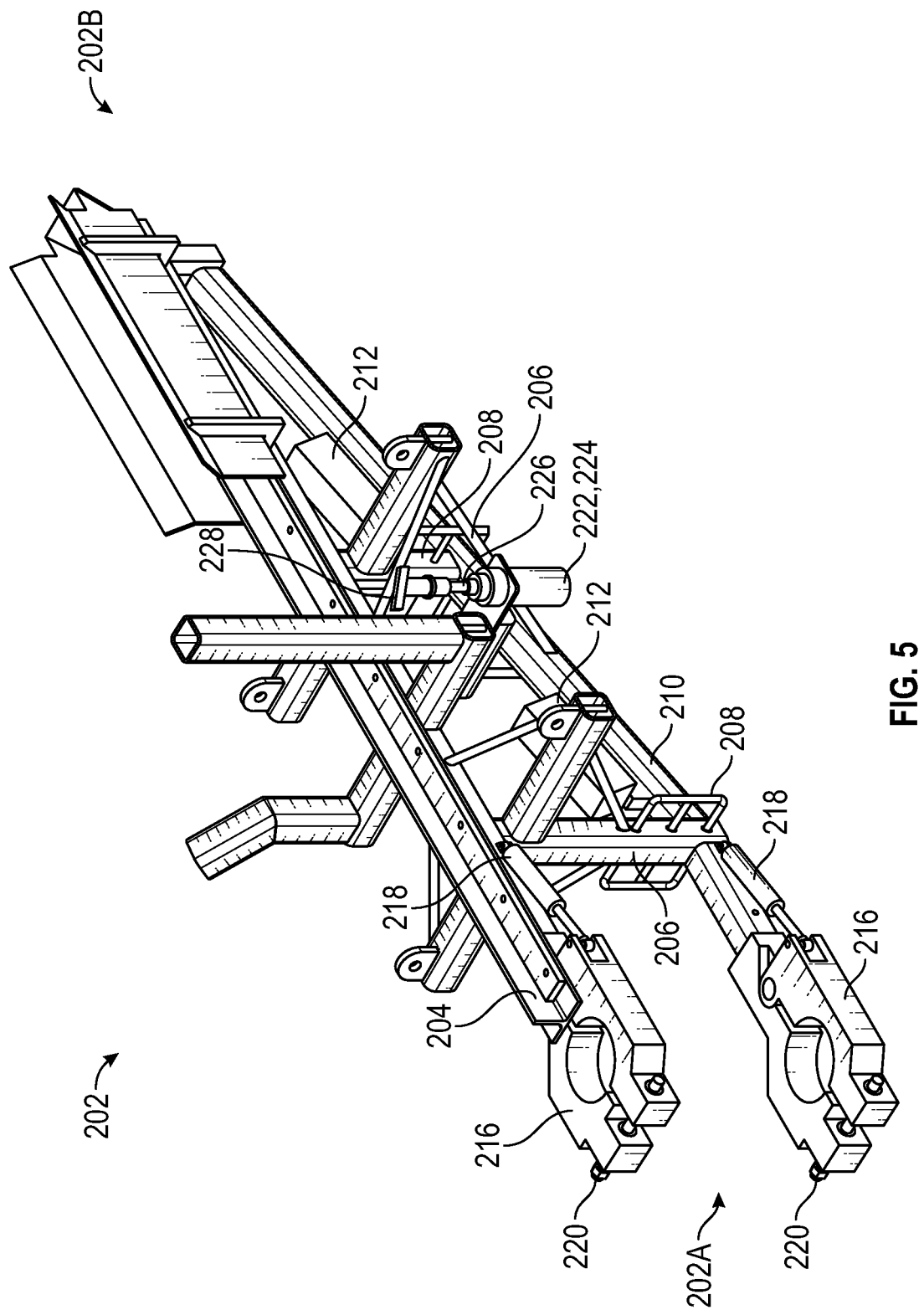
FIG. 5 is a perspective view of an embodiment of a landing structure in accordance with principles disclosed herein for deploying the hot tap assembly of FIG. 2.
Figure 6:
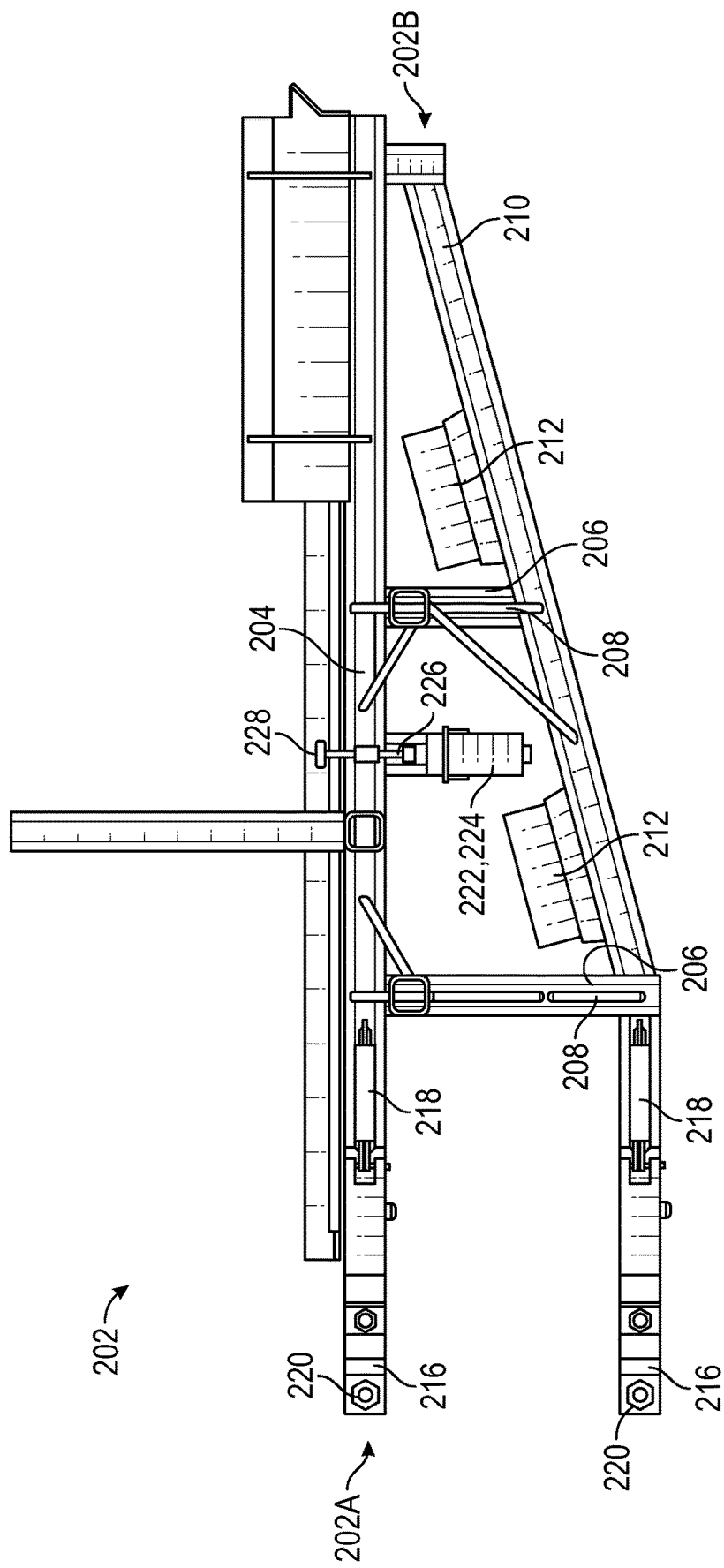
FIG. 6 is a side view of the landing structure of FIG. 5.
Figure 7:
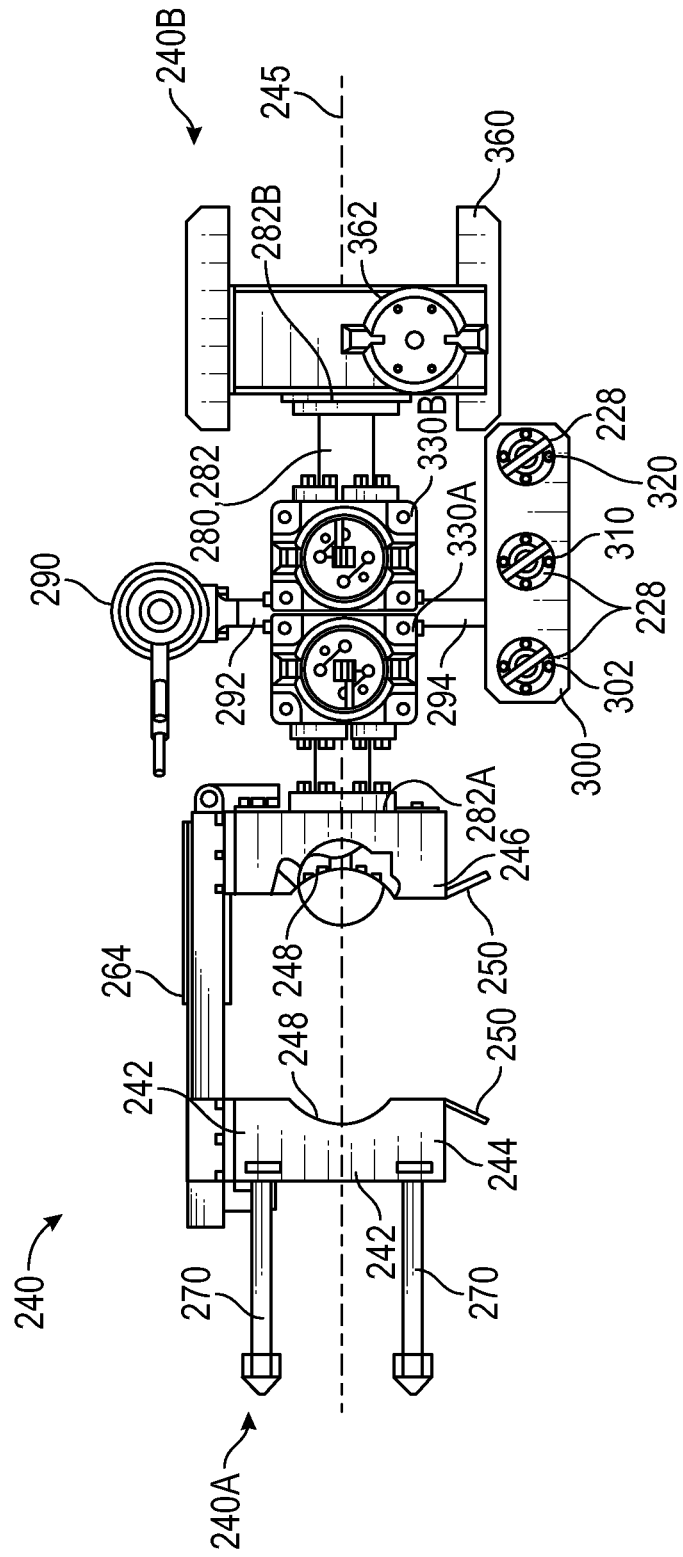
FIG. 7 is a top view of the clamp assembly of the hot tap assembly of FIG. 2 in an open position.
Figure 8:
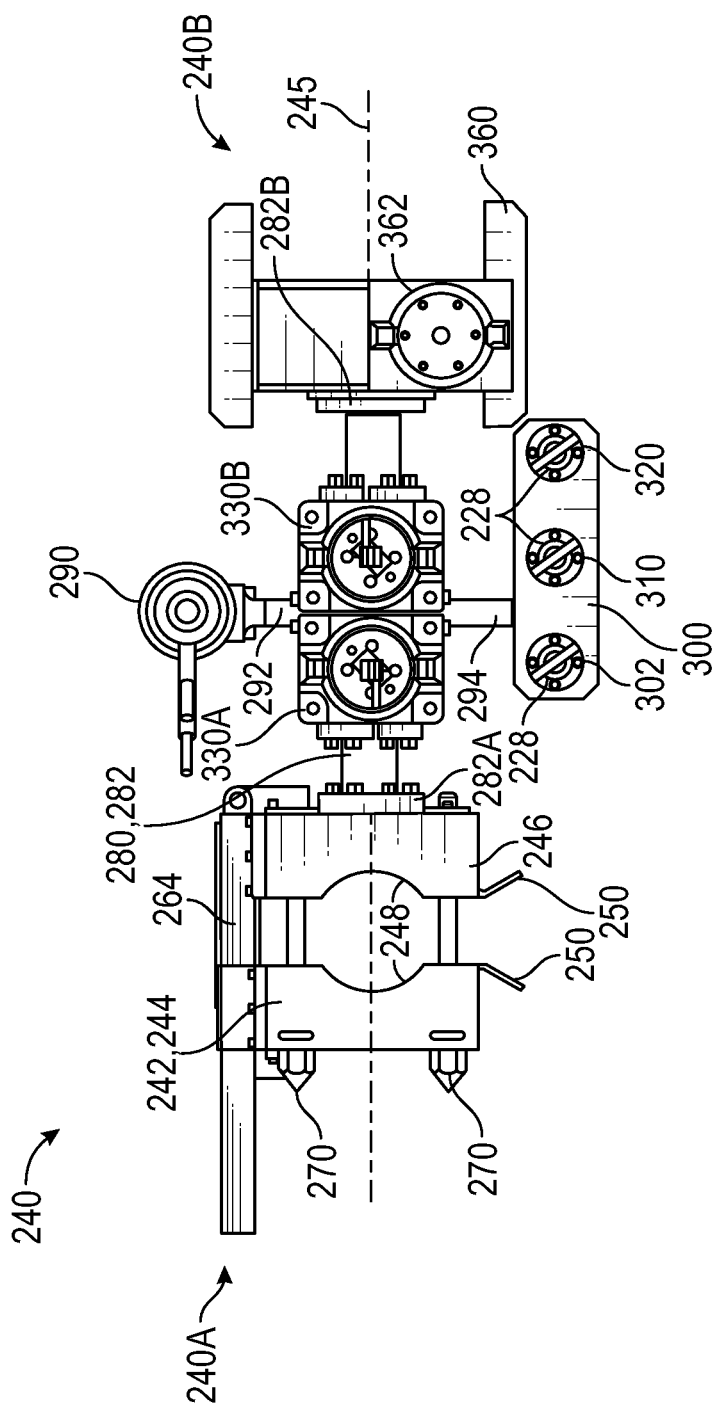
FIG. 8 is a top view of the clamp assembly of FIG. 7 in a closed position.
Figure 9:
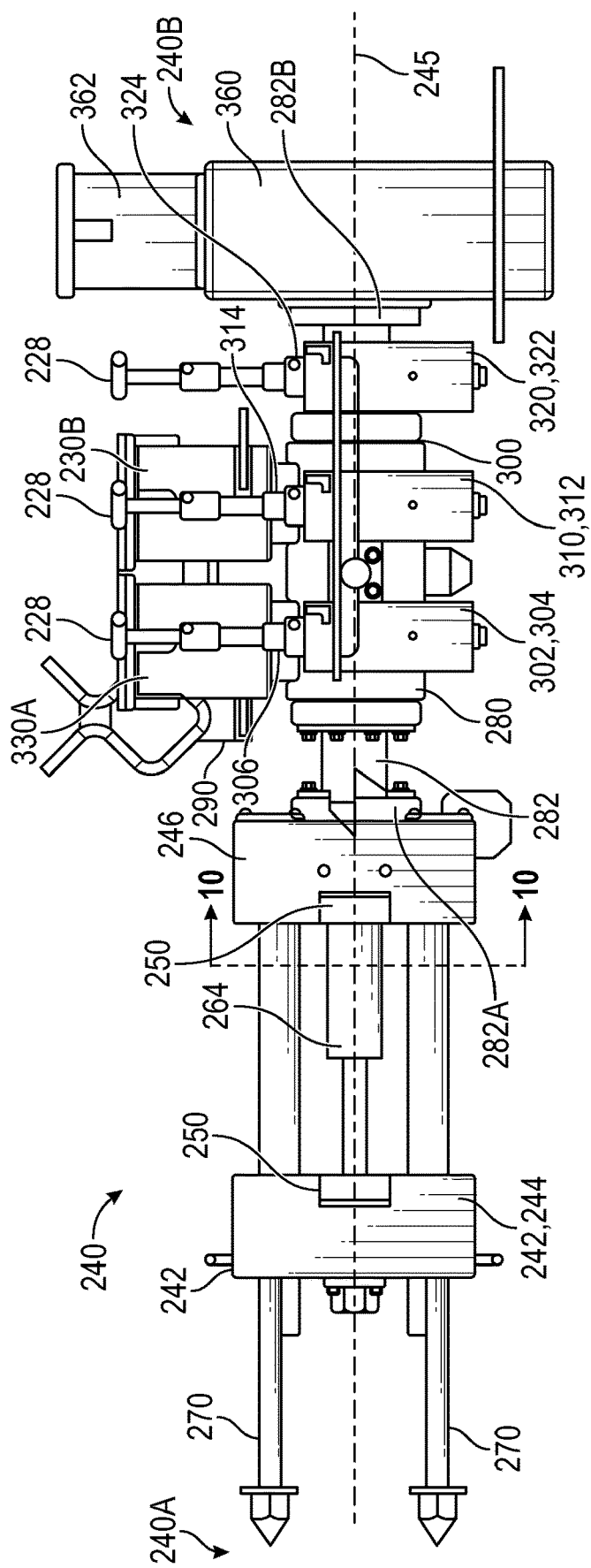
FIG. 9 is a side view of the clamp assembly of FIG. 7.
Figure 10:
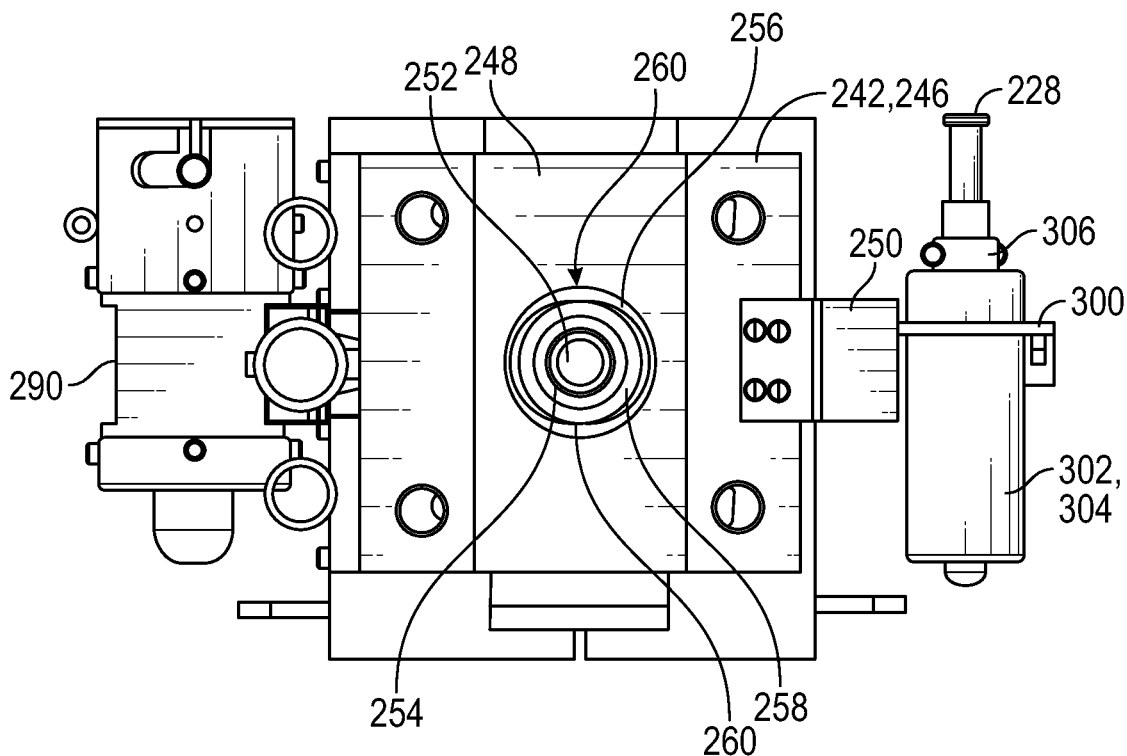
FIG. 10 is a cross-sectional view of the clamp assembly of FIG. 7 taken along section 10-10 of FIG. 9.
Figure 16:
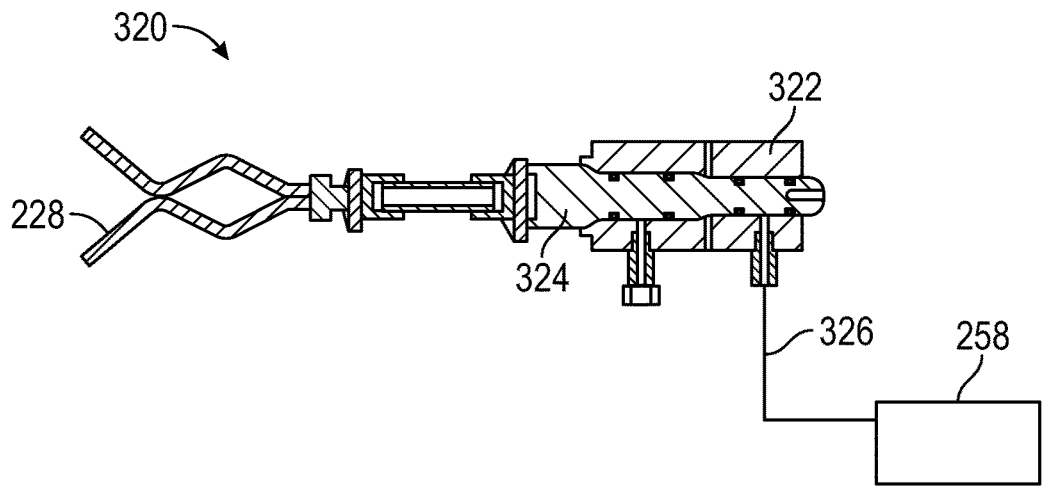

In this embodiment, landing structure 202 is separable from clamp assembly 240 and drill assembly 400. As will be described in more detail below, landing structure 202 may be transported separately to and installed on a subsea component of subsea fluid system 30 prior to transporting and/or coupling clamp assembly 240 and drill assembly 400 to landing structure 202. As best shown in FIGS. 5, 6, and 16, landing structure 202 has a first or inner end 202A and a second or outer end 202B opposite inner end 202A. Inner end 202A of landing structure 202 is positioned directly adjacent jumper 50 of subsea fluid system 30 when hot tap assembly 200 is coupled with jumper 50 while outer end 202B is positioned distal jumper 50. In this embodiment, landing structure 202 generally includes a first or upper support arm 204 and a second or lower support arm 210. Support arms 202, 210 are joined at the outer end 202B of landing structure 202 and are vertically spaced apart at inner end 202A.

Lower support arm 210 extends along a central or longitudinal axis oriented at a non-zero, acute angle relative to a central or longitudinal axis of upper support arm 204. A plurality of laterally spaced cross-supports 206 extend vertically between upper support arm 204 and lower support arm 210 for transferring loads between arms 202, 210. In this embodiment, each cross-support 206 includes a ROV handle 208 to assist ROV 120 with deploying and manipulating hot tap assembly 200. Additionally, in this embodiment, a plurality of sacrificial anodes 212 are coupled to lower support arm 200 to protect hot tap assembly 200 from galvanic corrosion during subsea operations.

Figure 13:
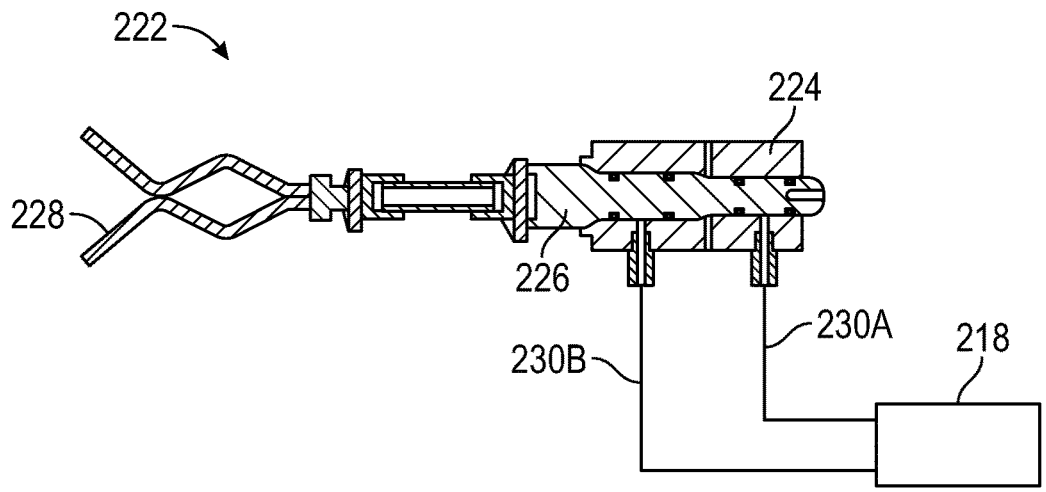
FIG. 13 is a schematic cross-sectional view of an embodiment of a hot stab of the landing structure of FIG. 5 in accordance with principles disclosed herein.
Figure 14:
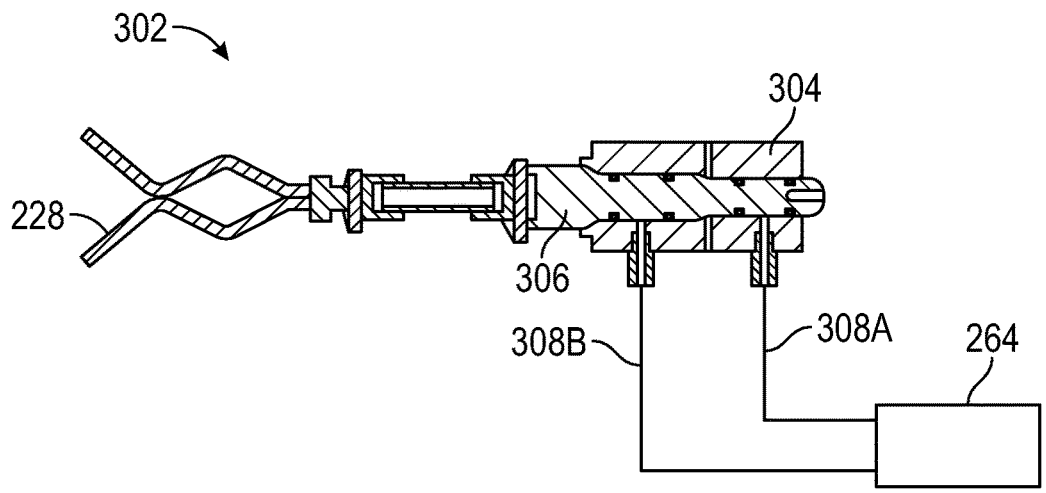
FIGS. 14-16 are schematic views of the hot stabs of the clamp assembly of FIG. 7.
Figure 15:
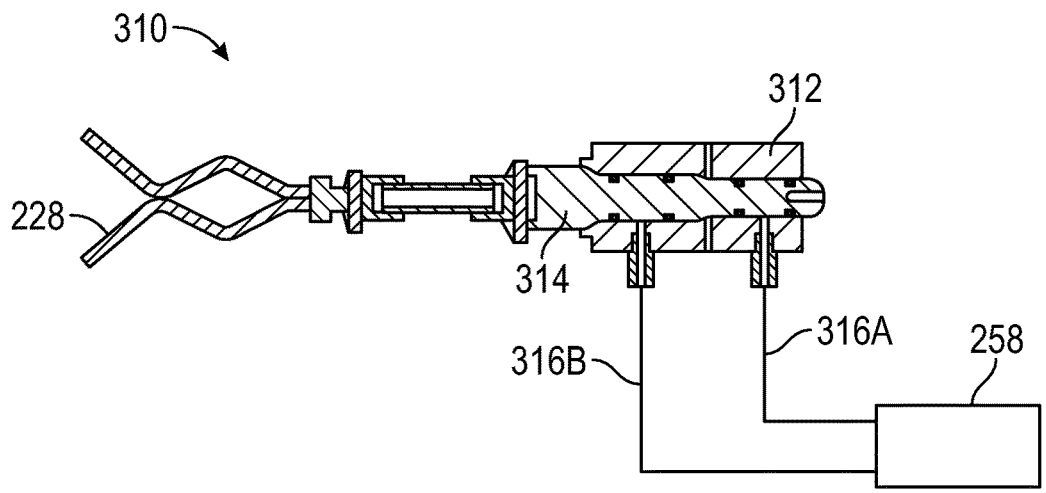

Referring still to FIGS. 5 and 6, a support jaw or clamp 216 is pivotably coupled to each support arm 204, 210 at the inner end 202A of landing structure 202. A first clamp actuator 218 is coupled between a first support clamp 216 and the upper support arm 204 and a second clamp actuator 218 is coupled between a second support clamp 216 and the lower support arm 210. Clamp actuators 218 actuate support clamps 216 between a first or open position and a second or closed position (shown in FIGS. 5, 6). Additionally, in this embodiment, each support clamp 216 includes a lock or fastener 220 for locking support clamps 216 in the closed position once landing structure 202 has been coupled to a subsea component of subsea fluid system 30. When support clamps 216 are in the open position, a subsea component of subsea fluid system 30 may be inserted into support clamps 216. Conversely, when support clamps 216 are in the closed position, landing structure 202 is secured to and locked on to the subsea component disposed between support clamps 216, thereby restricting and/or preventing relative movement between landing structure 202 and the subsea component. Additionally, with support clamps 216 disposed in the closed position, loads applied to landing structure 202 (e.g., loads applied to structure 202 from clamp assembly 240 and/or drill assembly 400) are transferred to the subsea component to which landing structure 202 is attached Landing structure 202 of hot tap assembly 200 also includes a support structure hot stab 222 coupled to lower support arm 210. Hot stab 222 interfaces with ROV 120 such that ROV 120 may selectably actuate support clamps 216 between their open and closed positions via clamp actuators 218. As shown particularly in FIG. 13, hot stab 222 includes an outer receptacle 224 which receives a ported valve 226 therein. Valve 226 of support structure hot stab 222 includes a handle 228 that may be manipulated by an arm 122 of ROV 120. Support structure hot stab 222 includes a first or clamp open flowpath 230A and a second or clamp closed flowpath 230B. Each support clamp 216 may be actuated into the open position in response to ROV 120 pressurizing clamp open flowpath 230A. Conversely, each support clamp 216 may be actuated into the closed position in response to ROV 120 pressurizing clamp closed flowpath 230B.

As shown in FIGS. 2-4, 7-11, clamp assembly 240 of hot tap assembly 200 has a first or inner end 240A, a second or outer end 240B opposite inner end 240A, and a central or longitudinal axis 245 extending from the inner end 240A to the outer end 240B. Inner end 240A of clamp assembly 240 is positioned directly adjacent jumper 50 of subsea fluid system 30 when hot tap assembly 200 is coupled with jumper 50 while outer end 240B is positioned distal jumper 50. Clamp assembly 240 is attached to and physically supported by the upper support arm 204 of landing structure 202.

In this embodiment, clamp assembly 240 generally includes a hot tap clamp 242, a hot tap manifold 280, and a drill clamp 360. Hot tap clamp 242 is positioned at the inner end 240A of clamp assembly 240 and is configured to clamp against a subsea fluid conduit (e.g., jumper 50) of subsea fluid system 30. In this embodiment, hot tap clamp 242 generally includes a first jaw 244, a second, opposing jaw 246, a hot tap clamp actuator 264, and a plurality of hot tap clamp fasteners or locks 270. Each jaw 244, 246 of hot tap clamp 242 comprises an arcuate or semi-cylindrical engagement surface 248. Additionally, each jaw 244, 246 includes a guide 250 extending laterally from jaws 244, 246. Guides 250 are positioned on a lateral side of hot tap clamp 242 opposite hot tap clamp actuator 264 and are configured to guide hot tap clamp 242 into position about a subsea fluid conduit of subsea fluid system 30.

Figure 11:
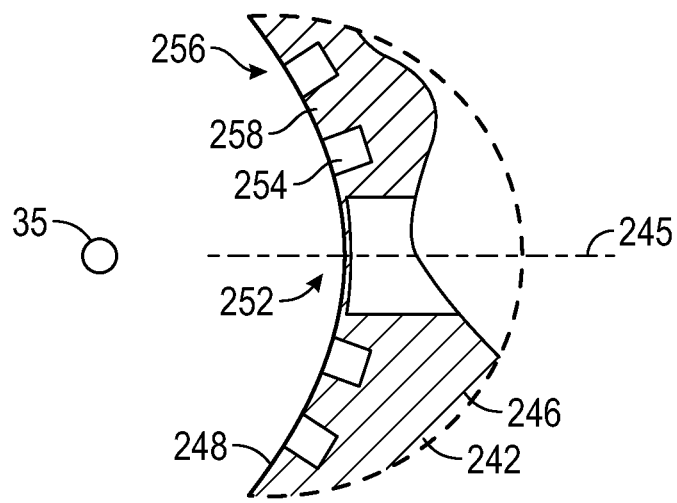
FIG. 11 is an enlarged cross-sectional view of the jaw of the clamp assembly of FIG. 7.

As best shown in FIG. 11, hot tap clamp 242 includes a central passage 252 that extends along central axis 245 and through the engagement surface 248 of second jaw 246. As will be discussed further herein, central passage 252 of second jaw 246 is in fluid communication with hot tap manifold 280. Additionally, an annular first or inner seal assembly 254 and an annular, second or outer seal assembly 256 are positioned on the engagement surface 248 of second jaw 246. Both inner seal assembly 254 and outer seal assembly 256 extend concentrically about the central axis 245 of clamp assembly 240 and entirely encircle central passage 252. As shown particularly in FIG. 11, central axis 245 may extend at a non-zero angle (e.g., orthogonally) relative to a central or longitudinal axis 35 (extending out of the page in FIG. 11) of a subsea fluid conduit (e.g., one of subsea fluid conduits 32, 36, and 50 of subsea fluid system 30, etc.).

Seal assemblies 254, 256 are each configured to seal along only a portion of the circumference of the subsea fluid conduit to which clamp assembly 240 is coupled, and thus clamp assembly 240 is not subjected to the hoop stresses subjected to conventional hot tap assemblies which seal about the entire circumference of the subsea fluid conduit to which they are coupled. In this manner, seal assemblies 254, 256 may seal relatively high pressure fluids within central passage 252 and annulus 258, such as fluids having pressures of approximately between 6,000 pounds PSI and 10,000 PSI; however, in other embodiments, seal assemblies 254, 256 may seal pressures in excess of 10,000 PSI.

Further, outer seal assembly 256 entirely encircles inner seal assembly 254 such that an annular surface or annulus 258 is formed between seal assemblies 254, 256. As will be discussed further herein, when hot tap assembly 200 is clamped to a subsea fluid conduit of subsea fluid system 30, seal assemblies 254, 256 act to seal annulus 258 from both central passage 252 and the surrounding subsea environment. In this embodiment, a pair of circumferentially spaced ports 260 extend through the engagement surface 248 of second jaw 246. Each port 260 is radially offset from the central axis 245 of clamp assembly 240 and is positioned radially between inner seal assembly 254 and outer seal assembly 256. In this configuration, ports 260 are in fluid communication with annulus 258 but are sealed from central passage 252 and the surrounding subsea environment when hot tap assembly 200 is coupled to a subsea fluid conduit of subsea fluid system 30. Although in this embodiment second jaw 246 comprises a pair of ports 260, in other embodiments, the number of ports 260 may vary.

In this embodiment, hot tap clamp actuator 264 is laterally offset from, and extends parallel with, the central axis 245 of clamp assembly 240. Hot tap clamp actuator 264 selectably actuates hot tap clamp 242 between a first or open position (shown in FIG. 7) and a second or closed position (shown in FIG. 8) by displacing first jaw 244 along central axis 245 towards the outer end 240B of clamp assembly 240. When hot tap clamp 242 in the open position, a subsea fluid conduit of subsea fluid system 30 may be inserted into hot tap clamp 242 between the engagement surfaces 248 of jaws 244, 246. Conversely, when hot tap clamp 242 is in the closed position, clamp assembly 240 is locked to the subsea fluid conduit extending through hot tap clamp 242, restricting relative movement between clamp assembly 240 and the subsea fluid conduit. Additionally, when hot tap clamp 242 is in the closed position, an outer surface of the subsea fluid conduit engaged by clamp assembly 240 is engaged or contacted by the engagement surface 248 of each jaw 244, 246 of hot tap clamp 242. In this embodiment, hot tap clamp locks 270 lock hot tap clamp 242 in the closed position with the subsea fluid conduit engaged by the engagement surfaces 248 of jaws 244, 246.

As shown particularly in FIGS. 2-4, 7-11, the hot tap manifold 280 of clamp assembly 240 is configured to selectably route fluids and/or tools to the central passage 252 of the second jaw 246 of hot tap clamp 242. In this embodiment, hot tap manifold 280 generally includes a central conduit or cylinder 282, a hot stab connector 290, and a clamp ROV panel 300. Central conduit 282 extends coaxially with central axis 245 of clamp assembly 240 and includes a first or inner end 282A coupled to the second jaw 246 of hot tap clamp 242 and a second or outer end 282B, opposite inner end 282A, which is coupled to drill clamp 360. Central conduit 282 includes an internal passage in fluid communication with central passage 252 of the second jaw 246 of hot tap clamp 242.

Hot stab connector 290 provides an interface through which materials (e.g., fluid and/or tools) may be transported to the central passage 252 of the second jaw 246 of hot tap clamp 242. For example, ROV 120 may connect with hot stab connector 290 to transport materials between ROV 120 and central passage 252 of hot tap clamp 242. Similarly, coil tubing 104 may connect with hot stab connector 290 to transport materials between coil tubing 104 and central passage 252. In this embodiment, hot stab connector 290 of hot tap manifold 280 is connected to central conduit 282 via a first branch conduit 292 that extends laterally from central conduit 282 to hot stab connector 290. In this configuration, an internal passage of first branch conduit 292 is in selective fluid communication with the central passage 252 of hot tap clamp 242.

ROV panel 300 of hot tap manifold 280 is connected to central conduit 282 via a second branch conduit 294 that extends laterally from central conduit 282 to ROV panel 300. In this embodiment, ROV panel 300 of hot tap manifold 280 includes a clamp hot stab 302, an annulus flush hot stab 310, and an annulus test hot stab 320. Hot stabs 302, 310, and 320 include features in common with support structure hot stab 222, and shared features are labeled similarly. As shown particularly in FIGS. 7-9 and 14, clamp hot stab 302 includes an outer receptacle 304 which receives a ported valve 306 therein. Clamp hot stab 302 includes a first or clamp open flowpath 308A and a second or clamp closed flowpath 308B. Hot tap clamp actuator 264 may be actuated in a first direction to thereby actuate hot tap clamp 242 into the open position (shown in FIG. 7) in response to ROV 120 pressurizing clamp open flowpath 308A. Hot tap clamp actuator 264 may be actuated in a second direction to thereby actuate hot tap clamp 242 into the closed position (shown in FIG. 8) in response to ROV 120 pressurizing clamp closed flowpath 308B.

As shown particularly in FIGS. 7-9 and 15, annulus flush hot stab 310 includes an outer receptacle 312 which receives a ported valve 314 therein. Annulus flush hot stab 310 includes a first or injection flowpath 316A that is in fluid communication with a first port 260 of the pair of ports 260 and a second or return flowpath 316B in fluid communication with a second port 260 of the pair of ports 260. As will be described further herein, fluid may be supplied to annulus 258 of hot tap clamp 242 via the injection flowpath 316A, and the fluid supplied to annulus 258 may be returned to annulus flush hot stab 310 via return flowpath 316A. Thus, annulus flush hot stab 310 provides for the flushing of annulus 258 via the circulation of fluid between annulus flush hot stab 310 and annulus 258.

As shown particularly in FIGS. 7-9 and 16, annulus test hot stab 320 includes an outer receptacle 322 which receives a ported valve 324 therein. Annulus test hot stab 320 includes a single annulus test flowpath 326 that is in fluid communication with at least one of the ports 260 of the second jaw 246 of hot tap clamp 242. As will be described further herein, with hot tap assembly 200 coupled to a subsea fluid conduit of subsea fluid system 30, pressurized fluid may be supplied to annulus 258 of hot tap clamp 242 via the test flowpath 326 of annulus test hot stab 320. By pressurizing annulus 258, the sealing integrity between the outer surface of the subsea fluid conduit and both the inner seal assembly 254 and the outer seal assembly 256 of hot tap clamp 242 may be tested prior to drilling of the subsea fluid conduit by drill assembly 380.

In this embodiment, hot stab manifold 280 also includes a pair of ROV actuatable isolation valves 330A, 330B coupled to and extending from central conduit 282. A first isolation valve 330A of the pair of isolation valves 330A, 330B is configured to selectably isolate or seal the central passage 252 of hot tap clamp 242 and hot stab connector 290. In this configuration, first isolation valve 330A is positioned fluidically between central passage 252 and hot stab connector 290. A second isolation valve 330B of the pair of isolation valves 330A, 330B is configured to selectably isolate or seal hot stab connector 290 from drill assembly 400. In this configuration, second isolation valve 330B is positioned fluidically between drill assembly 400 and hot stab connector 290. Additionally, each of the pair of isolation valves 330A, 330B is positioned fluidically between central passage 252 of hot tap clamp 242 and drill assembly 400. Thus, when ROV 120 actuates each isolation valve 330A, 330B into a closed position, a dual seal barrier is provided between central passage 252 of hot tap clamp 242 and drill assembly 400.

In this embodiment, drill clamp 360 of clamp assembly 240 is coupled to the outer end 282B of the central conduit 282 of hot tap manifold 280. Drill clamp 360 includes an internal passage in fluid communication with the internal passage of the central conduit 282 of hot tap manifold 280. Drill clamp 360 includes a first or open position that permits drill assembly 400 to couple with and decouple from clamp assembly 240, and a second or closed position which locks drill assembly 400 with clamp assembly 240. Drill clamp 360 includes an ROV controllable valve or actuator 362 that actuates drill clamp 360 between the open and closed positions. In this embodiment, isolation valves 330A, 330B and drill clamp actuator 362 each comprise ROV torque buckets; however, in other embodiments, valves 330A, 330B and actuator 362 may comprise other ROV controllable devices.

Figure 12:
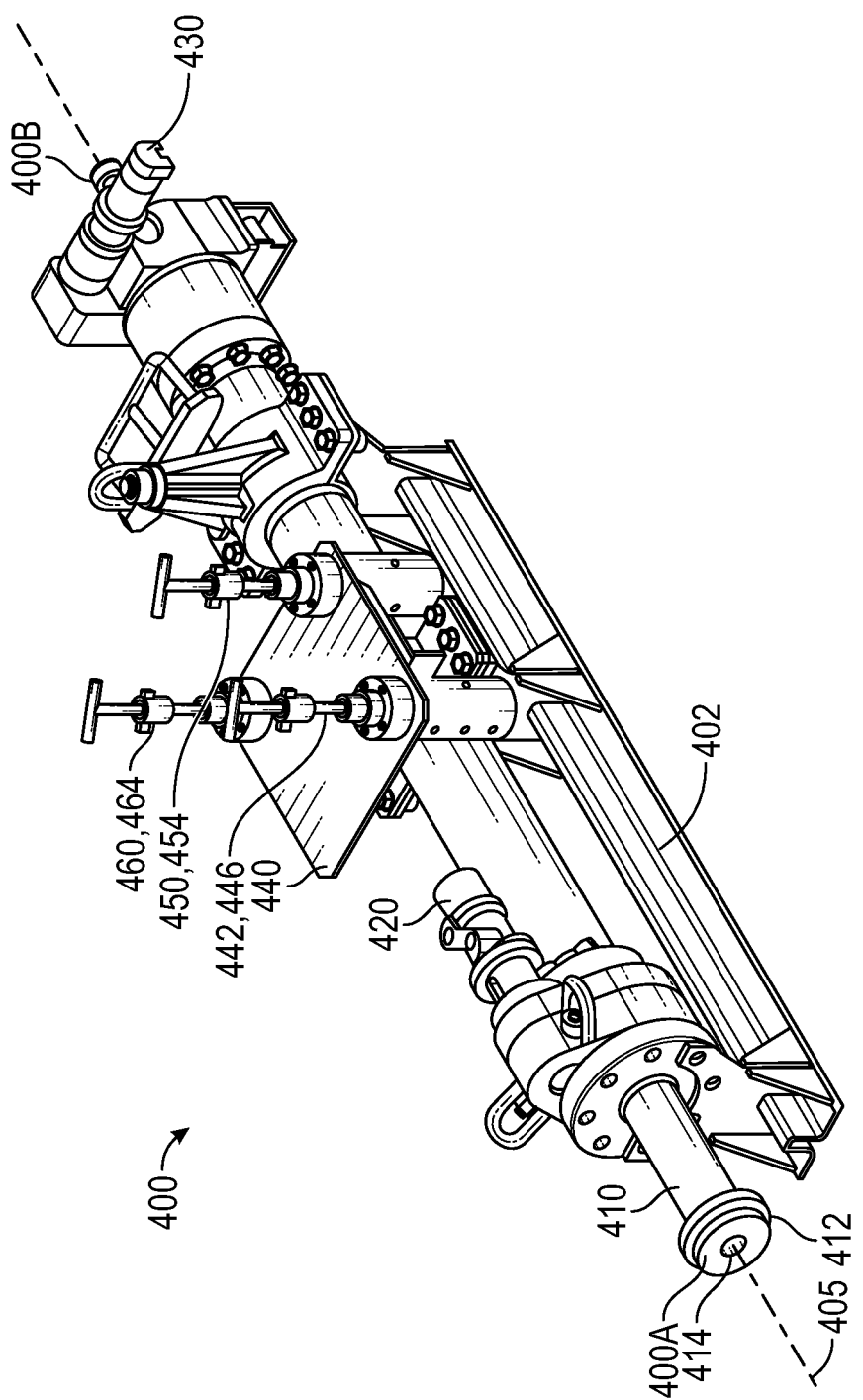
FIG. 12 is a perspective view of the drill assembly of the hot tap assembly of FIG. 2.

As shown particularly in FIG. 12, drill assembly 400 of hot tap assembly 200 has a first or inner end 400A, a second or outer end 400B opposite inner end 400A, and a central or longitudinal axis 405 extending from the inner end 400A to the outer end 400B. The inner end 400A of drill assembly 400 is configured to releasably couple with clamp assembly 240 via drill clamp 360 while outer end 400B is positioned opposite the subsea fluid conduit of subsea fluid system 30 to which hot tap assembly 200 is coupled during operation. Additionally, the central axis 405 of drill assembly 400 is positioned coaxially with central axis 245 of clamp assembly 240 when drill assembly 400 is coupled with clamp assembly 240.

In this embodiment, drill assembly 400 generally includes a landing or support guide 402, a central conduit or cylinder 410, a drill motor 420, a feed motor 430, and a drill ROV panel 440. Central conduit 410 of drill assembly 400 extends from inner end 400A to outer end 400B and includes a connector hub 412 positioned at inner end 400A for coupling with the drill clamp 360 of clamp assembly 240. Additionally, central conduit 410 includes a central passage 414 extending therethrough that receives a drill rotatably disposed therein. Central passage 414 extends coaxially with the central axis 405 of drill assembly 400. As will be described further herein, the drill housed in central conduit 410 is configured to tap or penetrate an external or outer cylindrical surface of one or more subsea fluid conduits (e.g., jumper 50) to establish fluid communication between the penetrated subsea fluid conduit and the internal passage of hot tap manifold 280.

Support guide 402 of drill assembly 400 is coupled to central conduit 410 and is configured to interface between the upper support arm 204 of landing structure 202 and central conduit 410 such that loads applied to drill assembly 400 are transferred to landing structure 202. Drill motor 420 and feed motor 430 of drill assembly 400 are each coupled to central conduit 410. Drill motor 420 selectably applies a desired amount of rotational torque to the drill housed in central conduit 410 while feed motor 430 controls the rate of longitudinal displacement of the drill through central passage 414 of central conduit 410 along central axis 405 of drill assembly 400.

Figure 17:
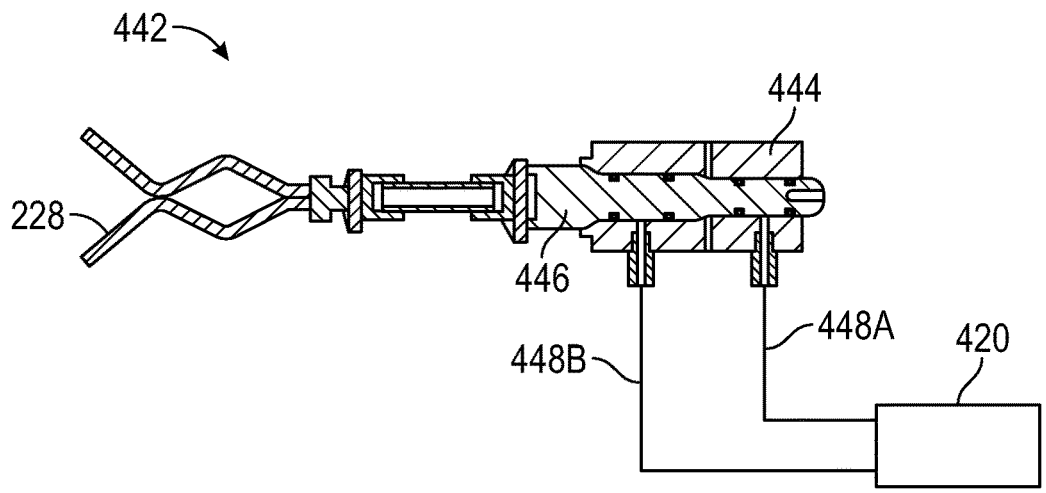
FIGS. 17-19 are schematic views of the hot stabs of the clamp assembly of FIG. 7.

In this embodiment, ROV panel 440 of drill assembly 400 includes a drill hot stab 442, a feed hot stab 450, and a drill flush hot stab 460. Hot stabs 442, 450, and 460 include features in common with hot stabs 222, 302, 310, and 320, and shared features are labeled similarly. As shown particularly in FIGS. 12 and 17, drill hot stab 442 includes an outer receptacle 444 which receives a ported valve 446 therein. Drill hot stab 442 includes a pair of flowpaths 448A, 448B in fluid communication with drill motor 420 and configured for controlling the rotational rate and torque outputted by drill motor 420 to the drill housed in the central conduit 410 of drill assembly 400.

Figure 18:
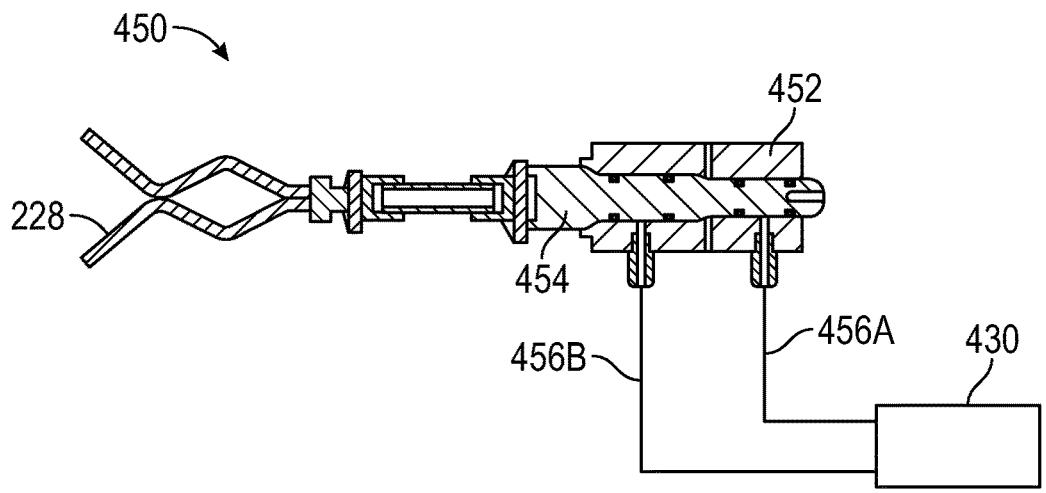
Figure 19:
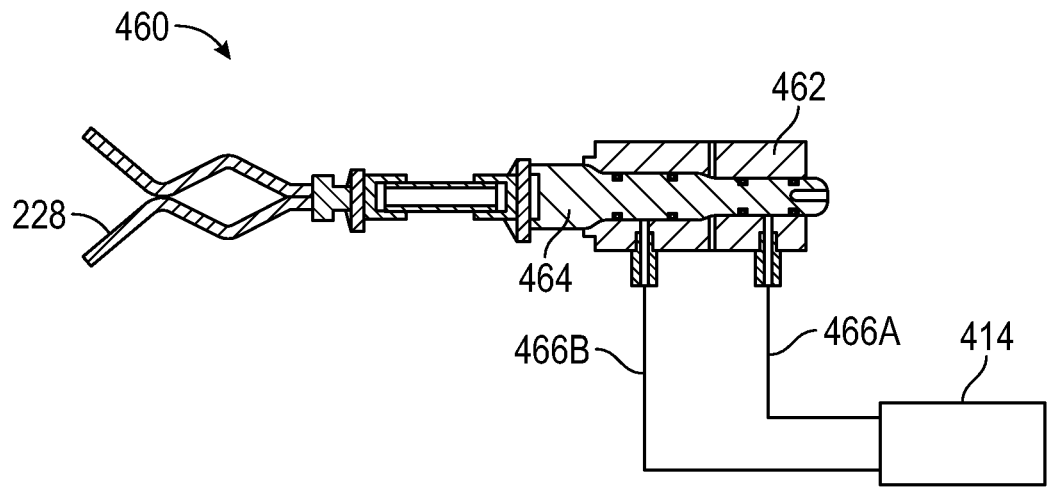

As shown particularly in FIGS. 12 and 18, feed hot stab 450 includes an outer receptacle 452 which receives a ported valve 454 therein. Feed hot stab 450 includes a pair of flowpaths 456A, 456B in fluid communication with feed motor 430 and configured for controlling the longitudinal position and rate of longitudinal movement along central axis 405 of the drill housed in the central conduit 410 of drill assembly 400. As shown particularly in FIGS. 12 and 18, drill flush hot stab 460 includes an outer receptacle 462 which receives a ported valve 464 therein. Drill flush hot stab 460 includes a first or injection flowpath 466A and a second or return flowpath 466B, each of which are in fluid communication with the central passage 414 of the central conduit 410 of drill assembly 400. As will be described further herein, fluid may be supplied to central passage 414 of central conduit 410 via the injection flowpath 466A, and the fluid supplied to central passage 414 may be returned to drill flush hot stab 460 via return flowpath 466A. Thus, drill flush hot stab 460 provides for the flushing of the central passage 414 of central conduit 410 via the circulation of fluid between drill flush hot stab 460 and central passage 414.

Referring to FIGS. 1-4, as described above, intervention system 100 may be employed to provide direct access or fluid communication to one or more subsea fluid conduits of subsea fluid system 30. In this embodiment, intervention system 100 may be employed to perform a remediation operation to identify the location of one or more blockages formed in subsea fluid system 30, and to remediate or remove the one or more blockages 70, 72, and 74. For example, in an embodiment, hot tap assembly 200 is deployed from surface vessel 102 to subsea fluid system 30 using ROV 120.

Once deployed at subsea fluid system 30, ROV 120 installs hot tap assembly 200 onto jumper 50 of subsea fluid system 30 at the connector hub 44 of second subsea terminal 42. Although in this embodiment hot stab assembly 200 is installed on jumper 50, in other embodiments, ROV 120 of intervention system 100 may install hot tap assembly 200 onto other components of subsea fluid system 30. In this embodiment, landing structure 202 is separately transported to the subsea fluid system 30 by ROV 120 prior to transporting clamp assembly 240 and drill assembly 400.

Particularly, with support clamps 216 each in the open position, ROV 120 guides landing structure 202 into position adjacent jumper 50. ROV 120 then positions landing structure 202 such that the cylindrical jumper 50 is inserted into the open support clamps 216 of landing structure 202. With jumper 50 inserted into the open support clamps 216, ROV 120 operates support structure 222 to actuate support clamps 216 into the closed position, thereby locking landing structure 202 of hot tap assembly 200 to the jumper 50 of subsea fluid system 30 at the connector hub 44 of second subsea terminal 42. In this configuration, loads applied to support structure 222 are transferred to jumper 50 and second subsea terminal 42. Thus, hot stab assembly 200 is light enough such that the entire weight of hot stab assembly 200 may be supported by jumper 50 and the subsea components of subsea fluid system 30 coupled thereto. In other words, hot stab assembly 200 need not be directly supported by the seabed 5 and instead may be vertically spaced from the seabed 5. Thus, hot tap assembly 200 may be coupled to subsea fluid conduits which are positioned vertically above the seabed 5, increasing the flexibility of hot tap assembly 200 for forming isolated fluidic connections with components of subsea fluid system 30.

With landing structure 202 attached to jumper 50 of subsea fluid system 30, ROV 120 retrieves clamp assembly 240 from surface vessel 102. In this embodiment, prior to retrieving clamp assembly 240, hot tap clamp 242 and drill clamp 360 are actuated into the open position, and isolation valves 330A, 330B are each actuated into the open position. ROV 120 positions clamp assembly 240 on the upper support arm 204 of landing structure 202 such that jumper 50 is received in the open hot tap clamp 242 of clamp assembly 240. ROV 120 then operates clamp hot stab 302 to actuate hot stab clamp 242 into the closed position such that the outer surface of jumper 50 is engaged or contacted by the engagement surfaces 248 of the jaws 244, 246 of hot tap clamp 242. Additionally, with hot tap clamp 242 in the closed position, seal assemblies 254, and 256 of second jaw 246 each sealingly engage the outer surface of jumper 50, thereby sealing central passage 252 and annulus 258 of second jaw 246 from the surrounding subsea environment.

With clamp assembly 240 positioned on landing structure 202 and clamped to jumper 50, ROV 120 retrieves drill assembly 400 of hot tap assembly 200 from surface vessel 102 and positions drill assembly 400 on the upper support arm 204 of landing structure 202 adjacent clamp assembly 240. In some embodiments, the internal passage of central conduit 282 and the central passage 252 of clamp assembly 240 are tested prior to landing drill assembly 400 on support structure 202. For example, the seal formed between inner seal assembly 254 and the outer surface of jumper 50 may be tested by pressurizing the internal passage of central conduit 282 via hot stab connector 290.

ROV 120 inserts the connector hub 412 of the central conduit 410 of drill assembly 400 into the open drill clamp 360 of clamp assembly 240. Once connector hub 412 is inserted into drill clamp 360, ROV 120 operates drill clamp actuator 362 to actuate drill clamp 360 into the closed position, thereby locking drill assembly 400 to the clamp assembly 240. Additionally, with drill clamp 360 in the closed position, central passage 414 of the central conduit 410 of drill assembly 400 is in fluid communication with the internal passage of the central conduit 282 of hot tap manifold 280, and both central passage 414 and the internal passage of central conduit 282 are sealed from the surrounding subsea environment. Although in this embodiment landing structure 202, clamp assembly 240, and drill assembly 400 are each separately transported by ROV 120 to subsea fluid system 30, in other embodiments, assemblies 240, 400 may be preassembled with landing structure 202 at surface vessel 102 prior to being transported to subsea fluid system 30.

In this embodiment, with drill assembly 400 locked to clamp assembly 240, annulus 258 is flushed and the integrity of the seal formed between seal assemblies 254, 256 and jumper 50 is tested by ROV 120. Specifically, ROV 120 operates annulus flush hot stab 310 to circulate a flushing fluid from annulus flush hot stab 310 to a first port 260 of the second jaw 246 of hot tap clamp 242 via injection flowpath 316A. The flushing fluid then circulates through annulus 258 and returns to annulus flush hot stab 310 via a second port 260 and return flowpath 316B. Once annulus 258 has been sufficiently flushed using annulus flush stab 310, the integrity of the seals formed between seal assemblies 254, 256 and the outer surface of jumper 50 is tested. Particularly, ROV 120 operates annulus test hot stab 320 to pressurize annulus test flowpath 326 and annulus 258 which is in fluid communication therewith. Fluid pressure in annulus 258 may be monitored at the surface vessel 102 to confirm the formation of a seal between the inner seal assembly 254 and jumper 50, and between outer seal assembly 256 and jumper 50.

In this embodiment, following the flushing and pressure testing of annulus 258, ROV 120 fluidically connects a hot tap fluid conduit or jumper (not shown in FIG. 1) to the hot stab connector 290 of hot tap assembly 200, the hot tap jumper being in fluid communication with coil tubing 104. In some embodiments, the hot tap jumper may be directly connected to coil tubing 104 via a subsea ROV manifold; however, in other embodiments, the hot tap jumper may be directly connected to coil tubing 104.

With isolation valves 330A, 330B each disposed in the open position, ROV 120 operates drill hot stab 442 and feed hot stab 450 to rotate the drill housed in the central passage 414 of central conduit 410 and to advance the drill from a first or original position through the internal passage of the central conduit 282 of hot tap manifold 280. The drill advances through the internal passage of central conduit 282, contacting and penetrating jumper 50 of subsea fluid system 30 such that fluid communication is established between jumper 50 and the internal passage of central conduit 282. Once jumper 50 has been successfully penetrated or tapped by the drill of drill assembly 400, ROV 120 operates feed hot stab 450 to retract the drill to its original position within central passage 414 of central conduit 410. The perforation formed in jumper 50 is sealed from the surrounding subsea environment by the sealing engagement formed between seal assemblies 254, 256 and the outer surface of jumper 50, where each seal assembly 254, 256 extends entirely around the perforation formed in jumper 50. Thus, seal assemblies 254, 256 may provide a dual seal barrier between fluid disposed in jumper 50 and the surrounding subsea environment.

Following the return of the drill to its original position, ROV 120 closes the second isolation valve 330B to fluidically isolate central passage 414 of central conduit 410 from hot stab connector 290 and jumper 50. In this embodiment, following the closure of second isolation valve 330B, ROV 120 operates drill flush hot stab 460 to circulate a flushing fluid through the central passage 414 of central conduit 410 to flush any debris or other materials or fluids released during the drilling of jumper 50. In some embodiments, following the flushing of the central passage 414 of central conduit 410, ROV 120 operates drill clamp actuator 362 to actuate drill clamp 360 into the open position, and retrieves drill assembly 400 to surface vessel 102. In certain embodiments, following the retrieval of drill assembly 400, one or more ROV caps are installed at the hot tap assembly 200.

In this embodiment, with second isolation valve 330B closed, hydrate inhibitor fluid is pumped from injection fluid tank 110, through coil tubing 104, the hot tap jumper, and the internal passage of the central conduit 282 of hot tap manifold 280, and into jumper 50 via the central passage 252 of hot tap clamp 242. The hydrate inhibitor fluid may remediate one or more of the blockages 70, 72, and 74 formed in the flowline 32, 36 of subsea fluid system 30.

Additionally, the fluidic connection formed between jumper 50 and coiled tubing 104 via hot tap assembly 200 may be used to form a vacuum within jumper 50 and portions of flowlines 32, 36 to assist in remediating one or more of blockages 70, 72, and 74.

During the remediation operation, annulus 258 may be used as a mold for forming an additional seal about the perforation formed in jumper 50 in the event of a failure of one or both of seal assemblies 254, 256. Particularly, ROV 120 is operated to fill annulus 258 with a sealing material (e.g., an epoxy, etc.) configured to form a seal between annulus 258 and the outer surface of jumper 50. Once one or more of the blockages 70, 72, and 74 have been remediated by intervention system 100, ROV 120 retrieves the clamp assembly 240 and landing structure 202 to the surface vessel 102 by operating hot stabs 222, 302 to open support clamps 216 and hot tap clamp 242, respectively.

Figure 20:
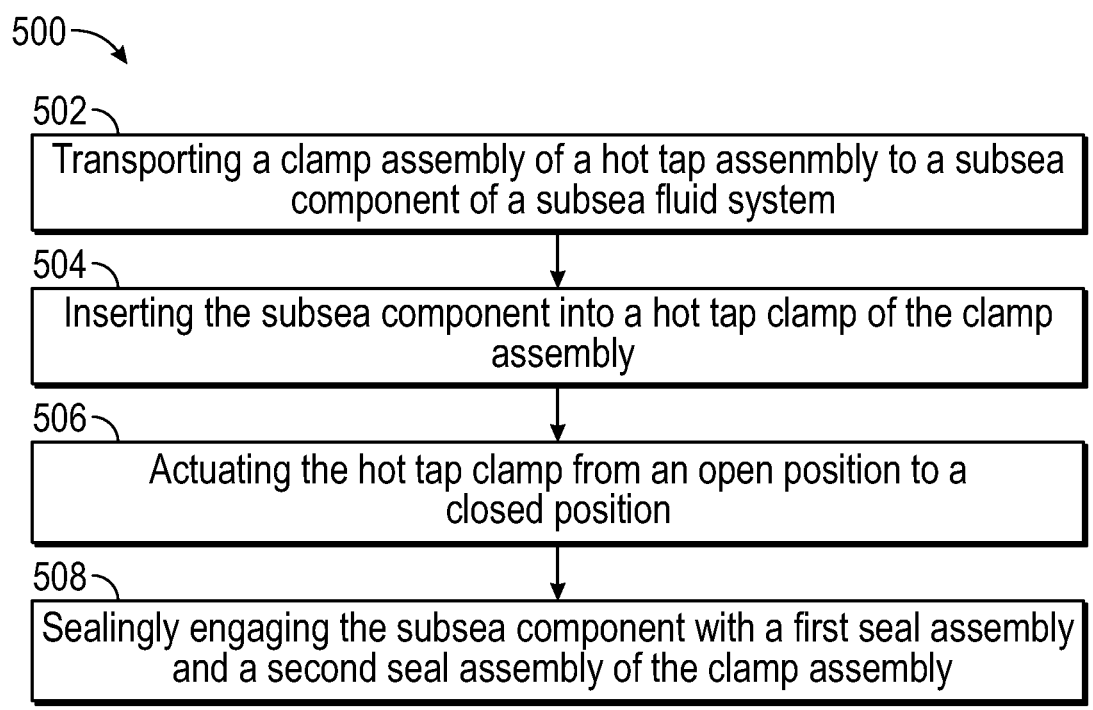
FIG. 20 is a flowchart illustrating an embodiment of a method for intervening a subsea fluid system in accordance with principles disclosed herein.

Referring to FIG. 20, a flowchart of a method 500 for intervening a subsea fluid system is shown. At block 502 of method 500, a clamp assembly of a hot tap assembly is transported to a subsea fluid conduit of the subsea fluid system. In some embodiments, block 502 comprises transporting or guiding clamp assembly 240 of hot tap assembly 200 to the jumper 50 of subsea fluid system 30 using ROV 120. At block 504 of method 500, the subsea fluid conduit is inserted into a hot tap clamp of the clamp assembly. In some embodiments, block 504 comprises inserting jumper 50 of subsea fluid system 30 into the hot tap clamp 242 of clamp assembly 240. At block 506 of method 500, the hot tap clamp is actuated from an open position to a closed position. In certain embodiments, block 506 comprises actuating hot tap clamp 242 of clamp assembly 240 from the open position (shown in FIG. 7) to the closed position (shown in FIG. 8) using ROV 120. At block 508 of method 500, the subsea fluid conduit is sealingly engaged with a first seal assembly and a second seal assembly of the clamp assembly. In certain embodiments, block 508 comprises sealingly engaging the outer surface of jumper 50 with both the inner seal assembly 254 and the outer seal assembly 356 of the second jaw 246 of hot tap clamp 242.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. For example, the relative dimensions of various parts, the materials from which the various parts are made, and other parameters can be varied. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A hot tap assembly for accessing a subsea fluid system, the hot tap assembly comprising:
   a landing structure configured to releasably attach to a subsea fluid conduit of the subsea fluid system;
   a clamp assembly positionable on the landing structure, wherein the clamp assembly comprises a hot tap clamp including a first jaw and a second jaw, wherein an annular first seal assembly and an annular second seal assembly are disposed on an engagement surface of the second jaw whereby an annulus is formed radially between the first seal assembly and the second seal assembly along the engagement surface; and a drill assembly positionable on the landing structure, wherein the drill assembly comprises a drill disposed in a central conduit that is insertable through a central passage formed in the second jaw of the clamp assembly;

wherein the clamp assembly comprises a hot stab assembly configured to fluidically pressurize the annulus formed between the first seal assembly and the second seal assembly;

wherein the hot tap clamp is configured to actuate between an open position configured to receive the subsea fluid conduit and a closed position configured to sealingly engage the subsea fluid conduit with the first seal assembly and the second seal assembly of the clamp assembly.

2. The hot tap assembly of claim 1, wherein both the first seal assembly and the second seal assembly extend concentrically entirely around the central passage of the second jaw of the clamp assembly, and wherein the second seal assembly extends concentrically entirely around the first seal assembly.

3. The hot tap assembly of claim 2, wherein an annular surface is formed on the second jaw between the first seal assembly and the second seal assembly, and wherein the annular surface extends entirely around the central passage of the second jaw of the clamp assembly.

4. The hot tap assembly of claim 3, wherein a first port extends through the annular surface formed on the second jaw of the clamp assembly.

5. The hot tap assembly of claim 4, wherein the hot stab assembly configured to circulate a fluid through the first port, the annular surface, and a second port extending through the annular surface.

6. The hot tap assembly of claim 1, wherein both the first seal assembly and the second seal assembly are positioned on a semi-circular engagement surface of the second jaw.

7. The hot tap assembly of claim 1, wherein the clamp assembly comprises a manifold comprising a hot stab connector for coupling with both a coil tubing extendable from a surface system, and a first isolation valve configured to fluidically isolate the hot stab connector from the central passage of the second jaw.

8. The hot tap assembly of claim 7, wherein the manifold comprises a second isolation valve configured to fluidically isolate the central conduit of the drill assembly from the central passage of the second jaw of the clamp assembly.

9. The hot tap assembly of claim 1, wherein the drill assembly comprises a drill motor configured to rotate the drill and a feed motor configured to feed the drill through the central passage of the second jaw of the clamp assembly.

10. The hot tap assembly of claim 1, wherein the landing structure comprises a support clamp that is actuatable between an open position configured to receive the subsea fluid conduit and a closed position configured to lock the landing structure to the subsea fluid conduit.

11. A system for intervening in a subsea fluid system, the system comprising: a surface system disposed on a surface vessel; a hot tap assembly deployable from the surface vessel and configured to connect a subsea fluid conduit of the subsea fluid system, wherein the hot tap assembly comprises: a clamp assembly including a first jaw and a second jaw and having an open position configured to receive the subsea fluid conduit and a closed position configured to sealingly engage the subsea fluid conduit with a first seal assembly and a second seal assembly of the clamp assembly, wherein an annular first seal assembly and an annular second seal assembly are disposed on an engagement surface of the second jaw whereby an annulus is formed radially between the first seal assembly and the second seal assembly along the engagement surface; and a landing structure configured to releasably couple with the subsea fluid conduit at a location along the subsea fluid conduit that is spaced from the hot tap assembly; wherein the clamp assembly comprises a hot stab assembly configured to fluidically pressurize the annulus formed between the first seal assembly and the second seal assembly; and a remotely operated underwater vehicle (ROV) deployable from the surface system and configured to connect the hot tap assembly to the subsea fluid conduit whereby fluid communication is established between the subsea fluid conduit and the hot tap assembly.

12. The system of claim 11, further comprising an injection pump fluidically connected to the hot tap assembly and configured to pump a fluid through the hot tap assembly and between the surface system and the subsea fluid conduit.

13. The system of claim 11, wherein: both the first seal assembly and the second seal assembly extend concentrically entirely around a central passage of the second jaw of the clamp assembly; and the annulus extends entirely around the central passage of the second jaw of the clamp assembly.

14. The system of claim 13, wherein hot stab assembly is configured to circulate a fluid through a first port extending through the annulus, along the annulus, and a second port extending through the annulus.

15. The system of claim 11, wherein the hot tap assembly comprises: a drill assembly positionable on the landing structure and comprising a drill positioned in a central conduit that is insertable through a central passage formed in the second jaw of the clamp assembly; wherein the clamp assembly is positionable on the landing structure.

16. The system of claim 11, wherein the clamp assembly comprises a manifold comprising a hot stab connector for coupling with a coil tubing extendable from the surface system and a first isolation valve configured to fluidically isolate the hot stab connector from a central passage of the second jaw.

17. A method for intervening in a subsea fluid system, comprising:
(a) transporting a clamp assembly of a hot tap assembly to a subsea fluid conduit of the subsea fluid system;
(b) inserting the subsea fluid conduit into a hot tap clamp of the clamp assembly;
(c) actuating the hot tap clamp including a first jaw and a second jaw a from an open position to a closed position using a remotely operated underwater vehicle (ROV);
(d) operating a hot stab assembly to fluidically pressurize an annulus formed radially between a first seal assembly and a second seal assembly each disposed on an engagement surface of the second jaw; and
(e) sealingly engaging the subsea fluid conduit with the first seal assembly and the second seal assembly of the clamp assembly.

18. The method of claim 17, further comprising:
(f) operating a hot stab assembly of the clamp assembly to pressurize an annulus positioned radially between the first seal assembly and the second seal assembly.

19. The method of claim 17, further comprising:
(f) forming a perforation in the subsea fluid conduit with a drill of the hot tap assembly, wherein the first seal assembly and the second seal assembly each entirely encircle the perforation.

\* \* \* \* \*